United States Patent
Ahn et al.

(10) Patent No.: US 12,074,664 B2
(45) Date of Patent: Aug. 27, 2024

(54) DATA TRANSMISSION DEVICE AND RECEPTION DEVICE IN WIRELESS AV SYSTEM

(71) Applicant: LG ELECTRONICS INC., Seoul (KR)

(72) Inventors: Chijun Ahn, Seoul (KR); Jinmin Kim, Seoul (KR); Jaewook Song, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 347 days.

(21) Appl. No.: 17/596,255

(22) PCT Filed: Jun. 18, 2019

(86) PCT No.: PCT/KR2019/007299
§ 371 (c)(1),
(2) Date: Dec. 6, 2021

(87) PCT Pub. No.: WO2020/256166
PCT Pub. Date: Dec. 24, 2020

(65) Prior Publication Data
US 2022/0311479 A1    Sep. 29, 2022

(51) Int. Cl.
*H04B 7/0413*    (2017.01)
*H04B 7/0491*    (2017.01)
(Continued)

(52) U.S. Cl.
CPC ......... *H04B 7/0413* (2013.01); *H04B 7/0491* (2013.01); *H04W 74/08* (2013.01); *H04W 76/14* (2018.02); *H04W 76/19* (2018.02)

(58) Field of Classification Search
CPC .. H04B 7/0491; H04B 7/0413; H04B 7/0495; H04B 7/0452; H04B 7/10; H04W 74/08;
(Continued)

(56) References Cited

U.S. PATENT DOCUMENTS

| | | | |
|---|---|---|---|
| 2015/0319700 A1* | 11/2015 | Oteri | H04W 24/10 455/127.1 |
| 2015/0382287 A1* | 12/2015 | Kim | H04W 8/005 370/338 |
| 2019/0075607 A1* | 3/2019 | Park | H04W 76/14 |

FOREIGN PATENT DOCUMENTS

| | | |
|---|---|---|
| KR | 1020180132669 | 12/2018 |
| WO | 2018083915 | 5/2018 |

OTHER PUBLICATIONS

PCT International Application No. PCT/KR2019/007299, International Search Report dated Mar. 18, 2020, 4 pages.
(Continued)

*Primary Examiner* — Angelica Perez
(74) *Attorney, Agent, or Firm* — LEE, HONG, DEGERMAN, KANG & WAIMEY

(57) ABSTRACT

The present invention relates to a data transmission device and reception device in a wireless AV system. The present specification discloses a wireless data reception device comprising: a communication unit configured to receive data relating to an image from a wireless data transmission device via a wireless channel; a display unit for outputting the image; a processor configured to execute a standby mode in which a wireless data reception device or the wireless data transmission device is deactivated, and a connection reestablishment mode in which, when the wireless data reception device and the wireless data transmission device are activated, a connection setup relating to the wireless data transmission device is performed; and a memory connected to the processor and configured to store data relating to the image according to a command of the processor.

18 Claims, 28 Drawing Sheets

(51) Int. Cl.
　　　*H04W 74/08*　　　(2009.01)
　　　*H04W 76/14*　　　(2018.01)
　　　*H04W 76/19*　　　(2018.01)

(58) Field of Classification Search
　　　CPC ..... H04W 76/14; H04W 76/19; H04W 48/12;
　　　　　　　H04W 48/16; H04W 74/0808; H04W
　　　　　　　84/18; H04W 76/00; H04W 76/10; H04W
　　　　　　　　　　　　　　　　　　　　　　74/00
　　　See application file for complete search history.

(56)　　　　　　　References Cited

OTHER PUBLICATIONS

Petrescu et al., "Transmission of IPV6 Packets over IEEE802.11 Networks in mode Outside the Context of a Basic Service Set (IPv6-over-80211ocb)," IETF draft-ietf-ipwave-ipv6-over-80211ocb-04.txt, Aug. 2017, 34 pages.

\* cited by examiner (A)

(B)

DATA TRANSMISSION DEVICE AND RECEPTION DEVICE IN WIRELESS AV SYSTEM

CROSS-REFERENCE TO RELATED APPLICATIONS

This application is the National Stage filing under 35 U.S.C. 371 of International Application No. PCT/KR2019/007299, filed on Jun. 18, 2019, the contents of which are all incorporated by reference herein in their entirety.

BACKGROUND OF THE DISCLOSURE

Field of the Disclosure

The present disclosure relates to wireless communication and, most particularly, to a device and method for transmitting data and a device and method for receiving data in a wireless audio/video (WAV) system.

Related Art

Recently, there has been a growing demand for high-resolution and high-quality pictures, such as high definition (HD) pictures and ultra-high definition (UHD) pictures, in various fields. With the appearance of new applications, the demands for technology allowing data streams including audio, video (or pictures), or at least a combination thereof, to be wirelessly transmitted, have been increasing. Since video data having higher resolution and higher picture quality has relatively more increased information size or bit size that is being transmitted, as compared to the existing (or conventional) video data, extensive research for wirelessly transmitting high-capacity data at a high speed is being carried out.

The Institute of Electrical and Electronics Engineers (IEEE) 802.11ad standard is an ultra-high speed wireless communication standard, which operates in a band of 60 GHz or more. The coverage range of signal is approximately 10 meters, but a throughput of 6 Gbps or more may be supported. Since operation is performed in a high frequency band, a signal propagation is dominated by a ray-like propagation. Signal quality may be improved so that a transmit (TX) or receive (RX) antenna beam can be arranged to be directed toward a strong spatial signal path. Presently, an IEEE 802.11ay standard, which is an evolved version of the IEEE 802.11ad, is being developed.

An existing standard, such as the IEEE 802.11ad or ay series, is established based on a premise of multiple access and communication among multiple devices. Conversely, an application of the wireless AV system is mostly designed based on a premise of 1:1 wireless communication (e.g., communication between a wireless set-top box and a wireless TV). Therefore, in case of directly applying an existing standard to the wireless AV system without modification, it may be difficult to expect efficient data transmission to be performed.

A procedure for operating a wireless AV system and an optimized communication design method for implementing such a procedure are required.

SUMMARY OF THE DISCLOSURE

Technical Objects

A technical object of the present disclosure is to provide a data transmitting device and a data receiving device in a wireless AV system.

Another technical object of the present disclosure is to provide a state machine operating method in a wireless AV system.

Technical Solutions

According to an aspect of the present disclosure, provided herein is a wireless data receiving device. The device includes a communication unit being configured to receive data related to a video through a wireless channel from a wireless data transmitting device, a display unit outputting the video, a processor being configured to perform an initial connection establishment mode performing connection setup related to the wireless data transmitting device, when the communication unit is turned on, a data transfer mode receiving the data related to the video through the communication unit, a stand-by mode during which the wireless data receiving device or wireless data transmitting device is deactivated, and a connection re-establishment mode performing connection setup related to the wireless data transmitting device, when the wireless data receiving device and wireless data transmitting device are activated, and a memory being configured to store operation algorithm and control information of an operation that is performed in at least one of the initial connection establishment mode, the data transfer mode, the stand-by mode, and the connection re-establishment mode, and to be connected to the processor so as to store the data related to the video according to instructions made by the processor.

In an aspect, the initial connection establishment mode includes scanning and initialization, and the connection setup, wherein the scanning and initialization may include a step of searching, by the communication unit, a directional multi-gigabit (DMG) beacon frame including information on a base service set (BSS) that is transmitted from the wireless data transmitting device at a beacon interval (BI) cycle period, and a step of joining the BSS, when the DMG beacon frame search is successful, and wherein the connection setup may include a step of performing, by the communication unit, sector level sweep (SLS) based on the DMG beacon frame, a step of performing association with no authentication with the wireless data transmitting device, and a step of performing MIMO beamforming setup.

In another aspect, the DMG beacon frame may be received through both a primary channel and a secondary channel that are allocated to the wireless data transmitting device based on channel bonding.

In yet another aspect, in the data transfer mode, the communication unit may alternately receive a data frame and a margin frame corresponding to the data frame, and a time duration during which the data frame and the margin frame are transmitted may be determined based on a length of a MAC input buffer.

In yet another aspect, in the data transfer mode, the communication unit may receive time stamp information each time a data frame is received and synchronizes timing of the data frame based on the time stamp information, and the margin frame may be used for at least one of data re-transmission, beamformed link maintenance, and null frame transmission.

In yet another aspect, activation and deactivation of the wireless data receiving device may each include a turn on operation and a turn off operation of the display unit, and activation and deactivation of the wireless data transmitting device may each include a turn on operation and a turn off operation of a transmission function transmitting the data related to the video.

In yet another aspect, in the stand-by mode, the communication unit may monitor the DMG beacon frame during a first time duration in which transmission of a DMG beacon frame, by the wireless data transmitting device, is scheduled, and the communication unit may perform DMG channel measurement during a second time duration in which transmission of the DMG beacon frame is not scheduled.

In yet another aspect, when the stand-by mode is initiated by a deactivation of the wireless data transmitting device, the communication unit may enter the stand-by mode by sequentially receiving, from the wireless data transmitting device, a disassociation frame instructing disassociation of the communication unit from the wireless data transmitting device and an announce frame for time synchronization function (TSF) timer synchronization, and the announce frame may include information on a location where the DMG beacon frame is transmitted.

In yet another aspect, in the stand-by mode, the communication unit may monitor the DMG beacon frame during a first time duration in which transmission of a DMG beacon frame, by the wireless data transmitting device, is scheduled, and may perform DMG channel measurement during a second time duration in which transmission of the DMG beacon frame is not scheduled, and the DMG beacon frame may include PCP association ready information indicating whether or not the wireless data transmitting device is ready for association.

In yet another aspect, in the stand-by mode, if it is verified that the wireless data transmitting device is ready for association based on the PCP association ready information, the communication unit may enter the connection re-establishment mode including scanning and initialization, and the connection setup, the scanning and initialization may include a step of searching, by the communication unit, a DMG beacon frame including information on a BSS that is transmitted from the wireless data transmitting device at a beacon interval (BI) cycle period, and a step of joining the BSS, when the DMG beacon frame search is successful, and the connection setup may include a step of performing, by the communication unit, SLS based on the DMG beacon frame, a step of transmitting information on the DMG channel measurement to the wireless data transmitting device, a step of performing association with the wireless data transmitting device in a preferred DMG channel that is selected based on the information on the DMG channel measurement, and a step of performing MIMO beamforming setup.

In yet another aspect, when the stand-by mode is initiated by a deactivation of the wireless data receiving device, the communication unit may enter the stand-by mode by transmitting, to the wireless data transmitting device, a disassociation frame instructing disassociation of the communication unit from the wireless data transmitting device, and by receiving, from the wireless data transmitting device, an announce frame for TSF timer synchronization, and the announce frame may include information on a location where the DMG beacon frame is transmitted.

In yet another aspect, in the stand-by mode, the communication unit may monitor the DMG beacon frame during a first time duration in which transmission of a DMG beacon frame, by the wireless data transmitting device, is scheduled, and may perform DMG channel measurement during a second time duration in which transmission of the DMG beacon frame is not scheduled.

In a further aspect, when the connection re-establishment mode is initiated by an activation of the wireless data receiving device, the communication unit may enter the connection re-establishment mode including scanning and initialization, and the connection setup, the scanning and initialization may include a step of searching, by the communication unit, a DMG beacon frame including information on a BSS that is transmitted from the wireless data transmitting device at a beacon interval (BI) cycle period, and a step of joining the BSS, when the DMG beacon frame search is successful, and the connection setup may include a step of performing, by the communication unit, SLS based on the DMG beacon frame, a step of transmitting information on the DMG channel measurement to the wireless data transmitting device, a step of performing association with the wireless data transmitting device in a preferred DMG channel that is selected based on the information on the DMG channel measurement, and a step of performing MIMO beamforming setup.

According to another aspect of the present disclosure, provided herein is a wireless data transmitting device. The device includes a communication unit being configured to transmit data related to a video through a wireless channel to a wireless data receiving device, a processor being configured to perform an initial connection establishment mode performing connection setup related to the wireless data receiving device, when the communication unit is turned on, a data transfer mode transmitting the data related to the video through the communication unit, a stand-by mode during which the wireless data transmitting device or wireless data receiving device is deactivated, and a connection re-establishment mode performing connection setup related to the wireless data receiving device, when the wireless data transmitting device and wireless data receiving device are activated, and a memory being configured to store operation algorithm and control information of an operation that is performed in at least one of the initial connection establishment mode, the data transfer mode, the stand-by mode, and the connection re-establishment mode.

In an aspect, the initial connection establishment mode includes scanning and initialization, and the connection setup, wherein the scanning and initialization may include a step of selecting, by the communication unit, a directional multi-gigabit (DMG) channel, and a step of transmitting a DMG beacon frame including information on a base service set (BSS), to the wireless data receiving device, at a beacon interval (BI) cycle period over the selected DMG channel, and wherein the connection setup may include a step of performing association with no authentication with the wireless data receiving device, and a step of performing MIMO beamforming setup.

In another aspect, the DMG beacon frame may be transmitted through both a primary channel and a secondary channel that are allocated to the wireless data transmitting device based on channel bonding.

In yet another aspect, in the data transfer mode, the communication unit may alternately transmit a data frame and a margin frame corresponding to the data frame, and a time duration during which the data frame and the margin frame are transmitted may be determined based on a length of a MAC input buffer.

In yet another aspect, in the data transfer mode, the communication unit may transmit time stamp information each time a data frame is transmitted and synchronizes timing of the data frame based on the time stamp information, and the margin frame may be used for at least one of data re-transmission, beamformed link maintenance, and null frame transmission.

In yet another aspect, activation and deactivation of the wireless data receiving device may each include a turn on operation and a turn off operation of the display unit, and activation and deactivation of the wireless data transmitting device may each include a turn on operation and a turn off operation of a transmission function transmitting the data related to the video.

In yet another aspect, in the stand-by mode, the communication unit may perform DMG channel measurement during a time duration in which transmission of the DMG beacon frame is not scheduled.

In yet another aspect, when the stand-by mode is initiated by a deactivation of the wireless data transmitting device, the communication unit may enter the stand-by mode by sequentially transmitting, to the wireless data receiving device, a disassociation frame instructing disassociation of the communication unit from the wireless data receiving device and an announce frame for time synchronization function (TSF) timer synchronization, and the announce frame may include information on a location where the DMG beacon frame is transmitted.

In yet another aspect, in the stand-by mode, the communication unit may perform DMG channel measurement during a time duration in which transmission of the DMG beacon frame is not scheduled, and the DMG beacon frame may include PCP association ready information indicating whether or not the wireless data transmitting device is ready for association.

In yet another aspect, when the connection re-establishment mode is initiated by an activation of the wireless data transmitting device, the communication unit may enter the connection re-establishment mode including scanning and initialization, and the connection setup, the scanning and initialization may include a step of selecting, by the communication unit, a DMG channel, and a step of transmitting a DMG beacon frame including information on a BSS, to the wireless data receiving device, at a beacon interval (BI) cycle period over the selected DMG channel, and the connection setup may include a step of receiving information on DMG channel measurement from the wireless data receiving device, a step of performing association with the wireless data receiving device in a preferred DMG channel that is selected based on the information on the DMG channel measurement, and a step of performing MIMO beamforming setup.

In yet another aspect, when the stand-by mode is initiated by a deactivation of the wireless data receiving device, the communication unit may enter the stand-by mode by receiving, from the wireless data receiving device, a disassociation frame instructing disassociation of the communication unit from the wireless data receiving device, and by transmitting, to the wireless data receiving device, an announce frame for TSF timer synchronization, and the announce frame may include information on a location where the DMG beacon frame is transmitted.

In yet another aspect, in the stand-by mode, the communication unit may perform DMG channel measurement during a time duration in which transmission of the DMG beacon frame is not scheduled.

In a further aspect, when the connection re-establishment mode is initiated by an activation of the wireless data receiving device, the communication unit may enter the connection re-establishment mode including scanning and initialization, and the connection setup, wherein the scanning and initialization may include a step of selecting, by the communication unit, a DMG channel, and a step of transmitting a DMG beacon frame including information on a BSS, to the wireless data receiving device, at a beacon interval (BI) cycle period over the selected DMG channel, and the connection setup may include a step of receiving information on DMG channel measurement from the wireless data receiving device, a step of performing association with the wireless data receiving device in a preferred DMG channel that is selected based on the information on the DMG channel measurement, and a step of performing MIMO beamforming setup.

Effects of the Disclosure

The procedure for operating a wireless AV system becomes clarified and an optimized communication design for implementing such a procedure may be provided.

DESCRIPTION OF EXEMPLARY EMBODIMENTS

Figure 1:
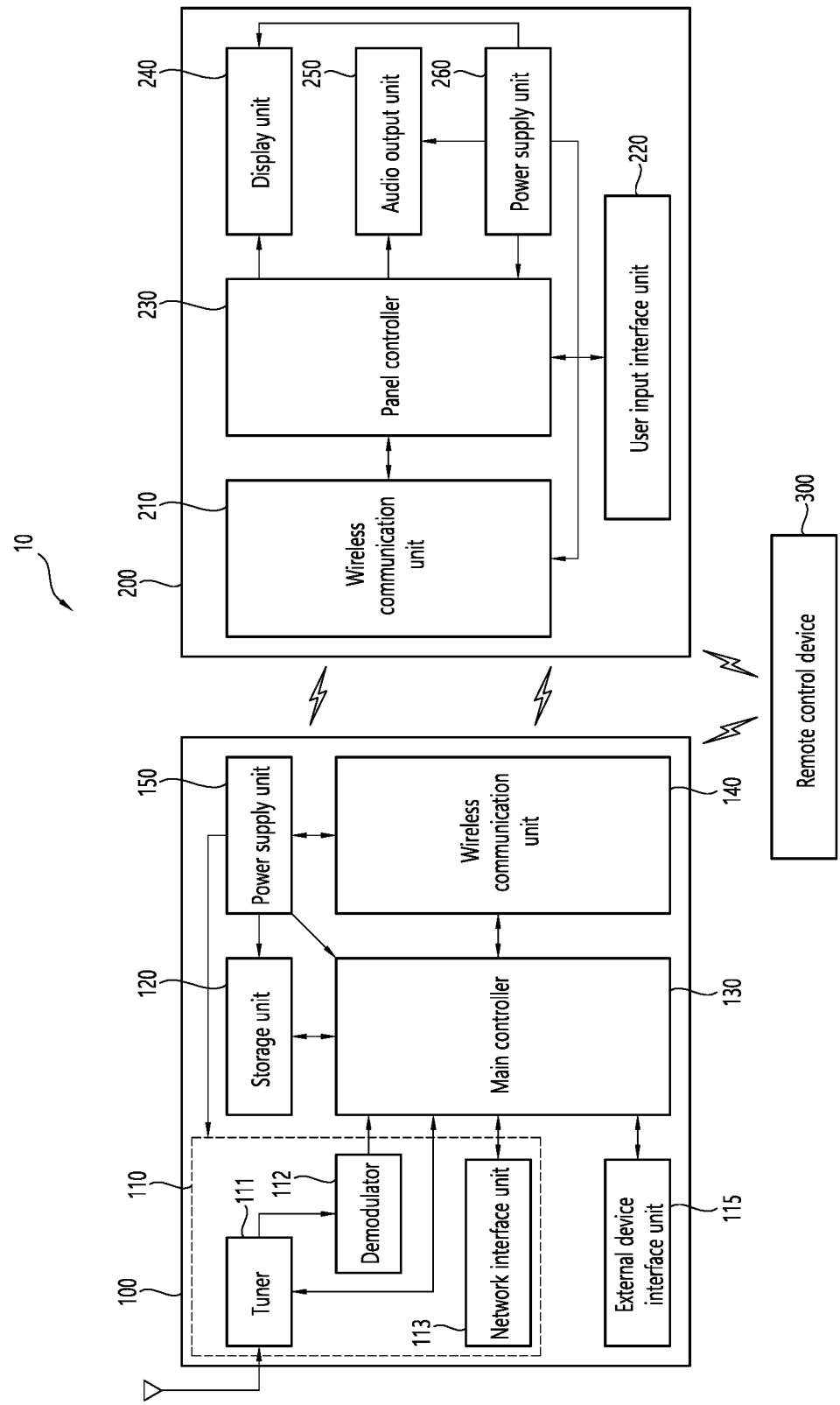
FIG. 1 is a block diagram of a wireless AV system according to an embodiment of the present disclosure.

The following detailed description illustrates embodiments of a device and method for transmitting wireless data and embodiments of a device and method for receiving wireless data that are provided according to the present disclosure. And, such embodiments do not represent the only forms of the present disclosure. The characteristics and features of the present disclosure are described with reference to exemplary embodiments presented herein. However, functions and structures that are similar or equivalent to those of the exemplary embodiments described in the present specification may be included in the scope and spirit of the present disclosure and may be achieved by other intended embodiments. Throughout the present specification, similar reference numerals will be used to refer to similar components or features. Hereinafter, embodiments of the present disclosure will be described in detail with reference to the accompanying drawings.

In recent years, the design of display devices, such as TVs, has become important, and display panels have become thinner with the development and evolution of technologies for display panels, such as OLED. However, due to the thickness of a driving circuit that is required in order to drive a display panel, there have been restrictions (or limitations) in manufacturing and designing thinner display panels. Therefore, a technology that is capable of separating components excluding components that are mandatorily required to be physically and electrically connected to the display panel, from the display panel, and equipping the physically or electrically separated components to a separate device (hereinafter referred to as a "main device") is being considered as a promising technology. In this case, a main device and a display device may be configured to exchange image signals and audio signals based on a wireless communication between the main device and the display device. The present disclosure relates to a wireless AV system, or a wireless display system being equipped with a main device and a display device that are provided as physically and/or electrically independent components, wherein media may be played (or reproduced) based on a wireless communication between the devices.

FIG. 1 is a block diagram of a wireless AV system according to an embodiment of the present disclosure.

Referring to FIG. 1, a wireless AV system 10 may include a main device 10100, a display panel device 200, and a remote control device 300.

The main device 100 may perform an operation of receiving an external signal in a wired or wireless format that is related to audio, video, pictures, images, multimedia, or at least one combination thereof, processing the received external signal by using various methods, so as to generate a data stream or a bitstream, and transmitting the generated data stream or bitstream to the display device 200.

In order to perform such operation, the main device 100 may include an external signal receiver 110, an external device interface unit 115, a storage unit 120, a main controller 130, a wireless communication unit 140, and a power supply unit 150.

The external signal receiver 110 may include a tuner 111, a demodulator 112, and a network interface unit 113.

The tuner 111 receives an external signal in a wired or wireless format that is related to audio, video, pictures, images, multimedia, or at least one combination thereof. For example, the tuner 111 may select a specific broadcast channel in accordance with a channel selection command and may receive a broadcast signal corresponding to the selected specific broadcast channel.

The demodulator 112 may separate the received broadcast signal to a video signal, an image signal, a picture signal, an audio signal, and a data signal related to a broadcast program. And, then, the demodulator 112 may reconstruct (or restore or recover) the separated video signal, image signal, picture signal, audio signal, and data signal to a format that can be outputted.

The external device interface unit 115 may receive an application or an application list of a nearby (or neighboring) external device and may deliver (or communicate) the application or application list to the main controller 130 or storage unit 120.

The external device interface unit 115 may provide a connection path between the wireless AV system 100 and an external device. The external device interface unit 115 may receive an external input signal including audio, video, pictures, images, multimedia, or at least one combination thereof from an external device, which is connected to the main device 100 via wired or wireless connection, and may then deliver the received external input signal to the main controller 130. The external device interface unit 115 may include multiple external input terminals. The multiple external input terminals may include an RF terminal, an RGB terminal, one or more High Definition Multimedia Interface (HDMI) terminals, a USB terminal, a component terminal, an AV terminal, a CI terminal.

An external device that is connectable to the external device interface unit 115 may be any one of a set-top box, a Bluray player, a DVD player, a gaming system, a sound bar, a smart phone, a PC, a USB memory, a home theater system. However, these are merely exemplary.

The network interface unit 113 may provide an interface for connecting the main device 100 to a wired/wireless network including an internet network. The network interface unit 113 may transmit or receive data to or from another user or another electronic device through an accessed network or another network that is linked to the accessed network.

Additionally, some content data stored in the main device 100 may be transmitted to a user or an electronic device, which is selected from other users or other electronic devices that are pre-registered in the main device 100.

The network interface unit 113 may access a predetermined webpage through an accessed network or another network that is linked to the accessed network. That is, the network interface unit 113 may transmit or receive data to or from a corresponding server by accessing a predetermined webpage through the network.

Also, the network interface unit 113 may receive contents or data provided from a content provider or a network operator. That is, the network interface unit 113 may receive contents such as movies, advertisements, games, VODs, and broadcast signals, which are provided from a content provider or a network provider, and related information through the network.

Additionally, the network interface unit 113 may receive firmware update information and update files provided from a network operator and may transmit data to an internet or content provider or a network operator.

The network interface unit 113 may select and receive a wanted application among applications that are open to public, through the network.

The storage unit 120 may store programs for performing processing and control of each signal within the main controller 130, and then the storage unit 120 may store signal-processed image, voice, or data signals.

Additionally, the storage unit 120 may perform a function for temporarily storing image, voice, or data signals that are inputted from the external device interface unit 115 or network interface unit 113, and the storage unit 120 may also store information related to a predetermined image through a channel memory function.

The storage unit 120 may store an application or an application list that is inputted from the external device interface unit 115 or network interface unit 113.

The main controller 130 may control the main device 100 by using a user instruction (or command) that is inputted through the remote control device 300, or by using an internal program, and may access a network in order to be capable of downloading an application or an application list that is wanted by a user to the main device 100.

The main controller 130 enables user-selected channel information to be outputted along with a processed image or audio signal through a display device 200 or an audio output unit 250.

Additionally, the main controller 130 enables an image signal or audio signal, which is inputted from an external device, e.g., a camera or camcorder, through the external device interface unit 115, to be outputted through the display device 200 or audio output unit 250 in accordance with according to an external device image playback instruction (or command) that is received through the remote control device 300.

The main controller 130 may perform a control operation so that content stored in the storage unit 120, received broadcast content, or externally input content can be played back (or reproduced). Such content may be configured in various formats, such as a broadcast image, an externally inputted image, an audio file, a still image, an accessed (or connected) web screen, a document file, and so on.

The main controller 130 may decode a video, an image, a picture, a sound, or data related to a broadcast program being inputted through the demodulator 112, the external device interface unit 115, or the storage unit 120. Then, the main controller 130 may process the decoded data in accordance with encoding/decoding methods supported by the display device 200. Thereafter, the main controller 130 may process the encoded data by using various video/audio processing methods, such as compression and encoding, so as to transmit the corresponding data through a wireless channel, thereby generating a data stream or bitstream. Finally, the main controller 130 may transmit the generated data stream or bitstream to the display device 200 through the wireless communication unit 140. Depending upon the embodiments, the main controller 130 may also bypass the decoded data, without encoding the decoded data in accordance with the encoding/decoding methods supported by the display device 200, and may directly transmit the decoded data to the display device 200 through the wireless communication unit 140.

Also, the main controller 130 may be configured to implement the functions, procedures, and/or methods of a processor 1130 of a wireless data transmitting device 1100 that are to be described with reference to each embodiment of the present specification. Layers of the wireless interface protocol may be implemented in the processor 1130.

The wireless communication unit 140 may be operatively coupled to the main controller 130, for example, as a combination of a wireless communication chip and an RF antenna. The wireless communication unit 140 may receive a data stream or bitstream from the main controller 130, may generate a wireless stream by encoding and/or modulating the data stream or bitstream into a format that can be transmitted through a wireless channel, and may transmit the generated wireless stream to the display device 200. The wireless communication unit 140 establishes a wireless link, and the main device 100 and the display device 200 are connected through the wireless link. The wireless communication unit 140 may be configured based on various wireless communication modes, such as short-range wireless communication including Wi-Fi, Bluetooth, NFC, and RFID, or a mobile communication network (e.g., 3G, 4G, and 5G cellular networks). For example, the wireless communication unit 140 may perform communication by using a communication protocol, such as a standard of the IEEE 802.11 series.

The power supply unit 150 supplies power to the external signal receiver 110, the external device interface unit 115, the storage unit 120, the main controller 130, and the wireless communication unit 140. Methods for receiving power from an external source performed by the power supply unit 150 may include a terminal method and a wireless method. In case the power supply unit 150 receives power by using a wireless method, the power supply unit 150 may include a separate configuration in order to wirelessly receive power. For example, the power supply unit 150 may include a power pick-up unit configured to be magnetically coupled with an external wireless power transmitting device so as to receive wireless power, and a separate communication and control unit configured to perform communication with the wireless power transmitting device in order to receive wireless power and to control transmission and reception of wireless power.

The wireless communication unit 140 may also be wirelessly connected to the remote control device 300, thereby being capable of transferring (or delivering) signals inputted by the user to the main controller 130 or transmitter (or delivering) signals from the main controller 130 to the user. For example, the wireless communication unit 140 may receive or process control signals, such as power on/off, screen settings, and so on, of the main device 100 from the remote control device 300 or may process control signals received from the main controller 130 so that the processed signals can be transmitted to the remote control device 300 in accordance with various communication methods, such as Bluetooth, Ultra Wideband (WB), ZigBee, Radio Frequency (RF), or Infrared (IR) communication, and so on.

Additionally, the wireless communication unit 140 may deliver (or communicate) control signals that are inputted from a local key (not shown), such as a power key, a volume key, a setup key, and so on, to the main controller 130.

Subsequently, the display device 200 may process a wireless stream, which is received from the main device 100 through a wireless interface, by performing a reverse process of a signal processing operation that is performed by the main device 100, and, then, the display device 200 may output a display or audio (or sound). In order to perform such operation, the display device 200 may include a wireless communication unit 210, a user input interface unit 220, a panel controller 230, a display unit 240, an audio output unit 250, and a power supply unit 260.

The wireless communication unit 210 may be configured as a combination of a wireless communication chip and an RF antenna. The wireless communication unit 210 is connected to the wireless communication unit 140 of the main device 100 through a wireless link and performs wireless communication with the wireless communication unit 140 of the main device 100. More specifically, the wireless communication unit 210 receives a wireless stream from the wireless communication unit 140 of the main device 100, demodulates the received wireless stream, and transmits the demodulated wireless stream to the panel controller 230. The wireless communication unit 210 may be configured based on various wireless communication modes, such as short-range wireless communication including Wi-Fi, Bluetooth, NFC, and RFID, or a mobile communication network (e.g., 3G, 4G, and 5G cellular networks). For example, the wireless communication unit 210 may perform communication by using a communication protocol, such as a standard of the IEEE 802.11 series.

The panel controller 230 decodes a signal that is demodulated by the wireless communication unit 210 so as to reconstruct (or recover) a bitstream or data stream. At this point, in case the bitstream or data stream is a compressed stream, the panel controller 230 may decompress or reconstruct the bitstream or data stream. Thereafter, the panel controller 230 may output the bitstream or data stream as a video signal, an image signal, a picture signal, an audio signal, or a data signal related to a broadcast program, and may transmit the signals to the display unit 240, the audio output unit 250, and the user input interface unit 220.

The video signal, the picture signal, the image signal, and so on, that are inputted to the display unit 240 may be displayed as a picture corresponding to the inputted picture signal. Alternatively, the picture signal that is processed by the panel controller 230 may be transmitted back to the main device 100 through the wireless communication unit 210 and may then be inputted to an external output device through the external device interface unit 115 of the main device 100.

The audio signal that is processed by the panel controller 230 may be audio-outputted to the audio output unit 250. Moreover, the audio signal that is processed by the panel controller 230 may be transmitted back to the main device 100 through the wireless communication unit 210 and may then be inputted to an external output device through the external device interface unit 115 of the main device 100.

Meanwhile, the panel controller 230 may control the display unit 240 so as to display a picture (or image). For example, the panel controller 230 may perform control operation, so that a broadcast picture (or image) that is inputted through the tuner 111, an externally inputted picture (or image) that is inputted through the external device interface unit 115, a picture (or image) that is inputted through the network interface unit, or a picture (or image) that is stored in the storage unit 120 can be displayed on the display unit 240. In this case, the picture (or image) that is displayed on the display unit 240 may be a still picture (or image) or a video, and may be a 2D image or a 3D image.

The panel controller 230 may be configured to implement the functions, procedures, and/or methods of a processor 1230 included in a wireless data receiving device 1200, which will be described with reference to each embodiment of the present specification. Additionally, the processor 1230 may be configured to implement the functions, procedures, and/or methods of the wireless data receiving 1200 that will be described with reference to each embodiment of the present specification.

The user input interface unit 220 may transmit a signal that is inputted, by the user, to the panel controller 230 or may transmit a signal from the panel controller 230 to the user. For example, the user input interface 220 may receive and process control signals, such as power on/off, screen settings, and so on, of the display device 200 from the remote control device 300, or may process control signals received from the panel controller 230 so that the processed signals can be transmitted to the remote control device 300 in accordance with various communication methods, such as Bluetooth, Ultra Wideband (WB), ZigBee, Radio Frequency (RF), or Infrared (IR) communication, and so on.

The user input interface unit 220 may transmit a control signal, which is inputted through a local key (not shown), such as a power key, a volume key, a setup key, and so on, to the panel controller 230.

The power supply unit 260 supplies power to the wireless communication unit 210, the user input interface unit 220, the panel controller 230, the display unit 240, and the audio output unit 250. Methods for receiving power from an external source performed by the power supply unit 260 may include a terminal method and a wireless method. In case the power supply unit 260 receives power by using a wireless method, the power supply unit 260 may include a separate configuration in order to wirelessly receive power. For example, the power supply unit 260 may include a power pick-up unit configured to be magnetically coupled with an external wireless power transmitting device so as to receive wireless power, and a separate communication and control unit configured to perform communication with the wireless power transmitting device in order to receive wireless power and to control transmission and reception of wireless power.

The remote control device 300 performs an operation of remotely controlling various features of the main device 100 or the display device 200, such as power on/off, channel selection, screen setup, and so on. Herein, the remote control device 300 may also be referred to as a "remote controller (or remote)".

Meanwhile, since the main device 100 and the display device 200, which are shown in FIG. 1, are provided only as an example of one embodiment of the present disclosure, some of the illustrated components may be integrated or omitted, or other components may be added according to the specifications of the main device 100 and the display device 200, which are actually implemented. That is, as necessary, two or more components may be integrated into one component, or one component may be divided into two or more components. In addition, a function that is performed in each block is presented to describe an embodiment of the present disclosure, and a specific operation or device will not limit the scope and spirit of the present disclosure.

According to another embodiment of the present disclosure, unlike the example shown in FIG. 1, the main device 100 may receive and play-back (or reproduce) an image (or picture) through the network interface unit 113 or the external device interface unit 115 without including the tuner 111 and the demodulator 112.

For example, the main device 100 may be implemented by being divided into an image processing device, such as a set-top box, for receiving broadcast signals or content according to various network services, and a content playback device for playing content input from the image processing device.

In this case, an operating method of the wireless AV system 10 according to an embodiment of the present disclosure that will hereinafter be described may be performed not only by the main device 100 and the display device 200, as described above with reference to FIG. 1, but also by one of the divided image processing device, such as the set-top box, or content playback device, which includes an audio output unit 250.

In light of system input/output, the main device 100 may be referred to as a wireless source device that wirelessly provides a source, and the display device 200 may be referred to as a wireless sink device that wirelessly receives a source. The wireless source device and the wireless sink device may implement wireless display (WD) communication technologies that are compatible with standards such as wireless HD, wireless home digital interface (WHDI), WiGig, wireless USB, and Wi-Fi display (WFD, which also known as Miracast).

In light of the applications, the main device 100 may be integrated to a form that configures part of a wireless set-top box, a wireless gaming console, a wireless digital video disc (DVD) player, a wireless router, or the like. In this case, the main device 100 may be provided as a wireless communication module or a chip. The display device 200 may be integrated to a form that configures part of a user device or electronic device (e.g., a wireless TV, a wireless monitor, a wireless projector, a wireless printer, a wireless vehicle dashboard display, a wearable device, an augmented-reality (AR) headset, a virtual-reality (VR) headset, or the like) having a display panel so as to display an image and a video. In this case, the display device 200 may be provided in the form of a wireless communication module or chip.

The main device 100 and the display device 200 may be integrated to forms that configure parts of a mobile device. For example, the main device 100 and the display device 200 may be integrated into a mobile terminal including a smartphone, a smartpad, a tablet PC, or other types of wireless communication devices, a portable computer having a wireless communication card, a personal digital assistant (PDA), a portable media player, a digital image capturing device, such as a camera or camcorder, or other flash memory devices having wireless communication capabilities. In this case, the main device 100 and the display device 200 may be provided in the form of wireless communication modules or chips.

Smartphone users may perform streaming or mirroring of a video and an audio, which are outputted by the users' smartphones, tablet PCs, or other computing devices, to another device, such as a television or a projector, in order to provide a higher resolution display or other enhanced user experience.

As described above, the main device 100 may receive an external signal in a wired or wireless format that is related to a medium, such as audio, video, a picture, an image, multimedia, or at least one combination thereof, and the main device 100 may process the received external signal by using various methods, so as to generate a data stream or bitstream, and may transmit the data stream or bitstream to the display device 200 through a wireless interface.

Hereinafter, image (or picture)/video/audio data that are transmitted through a wireless interface will be collectively referred to as wireless data. That is, the main device 100 may wirelessly communicate with the display device 200 and may transmit wireless data. Therefore, in light of a wireless data transceiving system 1000, the main device 100 may be referred to as a wireless data transmitting device 1100, and the display device 200 may be referred to as a wireless data receiving device 1200. Hereinafter, the present disclosure will be described in more detail in light of the wireless data transceiving system 1000. Firstly, a detailed block diagram of the wireless data transceiving system 1000 will be illustrated.

Figure 2:
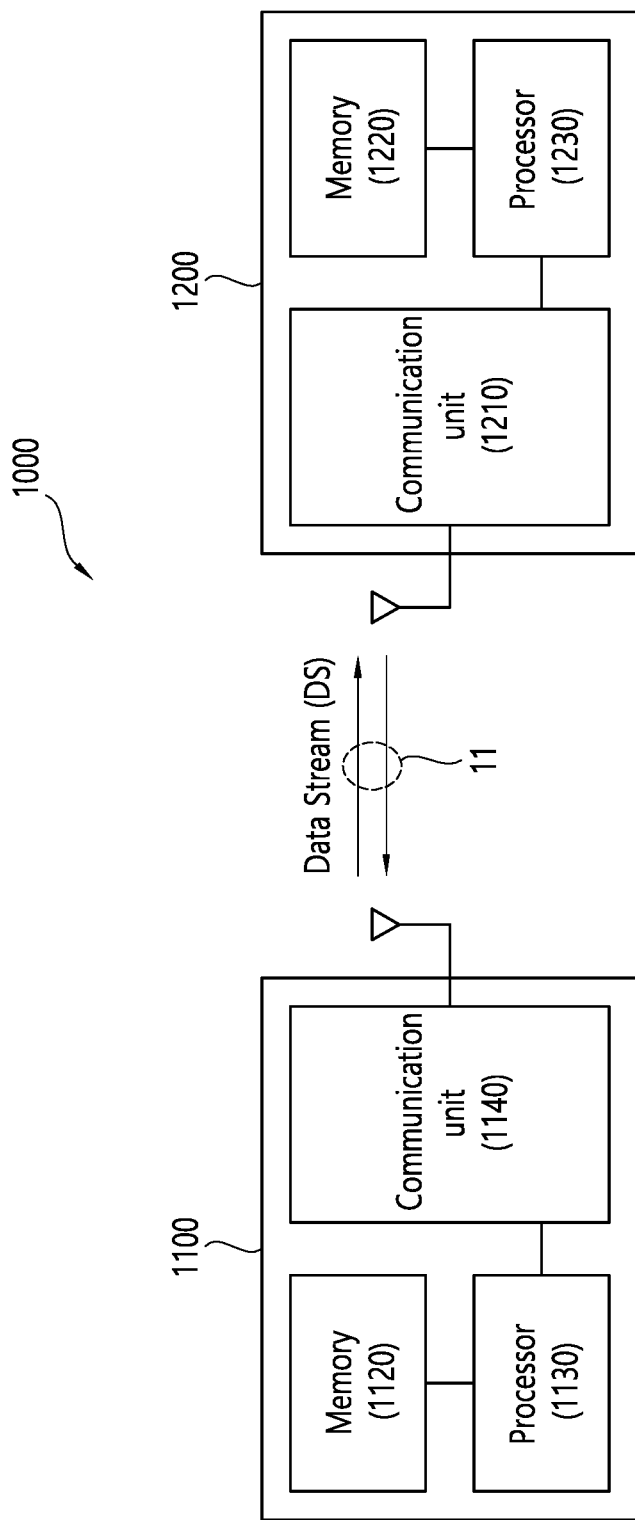
FIG. 2 is a block diagram showing a wireless data transceiving system according to an embodiment of the present disclosure.

FIG. 2 is a block diagram showing a wireless data transceiving system according to an embodiment of the present disclosure.

Referring to FIG. 2, a wireless data transceiving system 1000 refers to a system that wirelessly transmits and receives a data stream. And, the wireless data transceiving system 1000 includes a wireless data transmitting 1100 and at least one wireless data receiving device 1200. The wireless data transmitting device 1100 is communicatively coupled to the at least one wireless data receiving device 1200.

According to an aspect, the data may be configured of an audio, a video, a picture, an image, multimedia, or at least one combination thereof.

According to another aspect, the data may include a bitstream in the form of a compressed audio, a bitstream in the form of a compressed video, a bitstream in the form of a compressed picture, a bitstream in the form of compressed multimedia, or at least one combination thereof. In this case, the wireless data transceiving system 1000 may also be referred to as a wireless compressed data stream transceiving system. Additionally, the wireless compressed data stream transceiving system 1000 may further include a functional or physical unit for compressing data.

Referring to the detailed configuration of each device, the wireless data transmitting device 1100 includes a processor 1130, a memory 1120, and a communication unit 1140, and the wireless data receiving device 1200 includes a communication unit 1210, a memory 1220, and a processor 1230.

The processor 1130 may be configured to implement the functions, procedures, and/or methods of the wireless data transmitting device 1100 that are to be described with reference to each embodiment of the present specification. Also, the processor 1230 may also be configured to implement the functions, procedures, and/or methods of the wireless data receiving device 1200 that are to be described with reference to each embodiment of the present specification. Layers of the wireless interface protocol may be implemented in the processors 1130 and 1230.

In light of the display system in FIG. 1, the processor 1130 may be configured to perform the function of the main controller 130. For example, the processor 1130 may decode a video, an image, a picture, a sound, or data related to a broadcast program that are inputted through the demodulator 112, the external device interface unit 115, or the storage unit 120, may process the decoded data by using various video/audio processing methods, such as compression and encoding, so as to transmit the data through a wireless channel, thereby generating a data stream or bitstream, and may transmit the generated data stream or bitstream to the display device 200 through the communication unit 1140.

The memories 1120 and 1220 are operatively coupled with the processors 1130 and 1230 and store various types of information for operating the processors 1130 and 1230.

The communication units 1140 and 1210 are operatively coupled with the processors 1130 and 1230 and wirelessly transmit and/or receive data. The communication units 1140 and 1210 establish a wireless link 11, and the wireless data transmitting device 1100 and the wireless data receiving device 1200 are inter-connected through the wireless link 11. The communication units 1140 and 1210 may be configured based on various wireless communication modes, such as short-range wireless communication including Wi-Fi, Bluetooth, NFC, and RFID, or a mobile communication network (e.g., 3G, 4G, and 5G cellular networks). For example, the wireless communication units 1140 and 1210 may perform communication by using a communication protocol, such as a standard of the IEEE 802.11 series.

Figure 3:
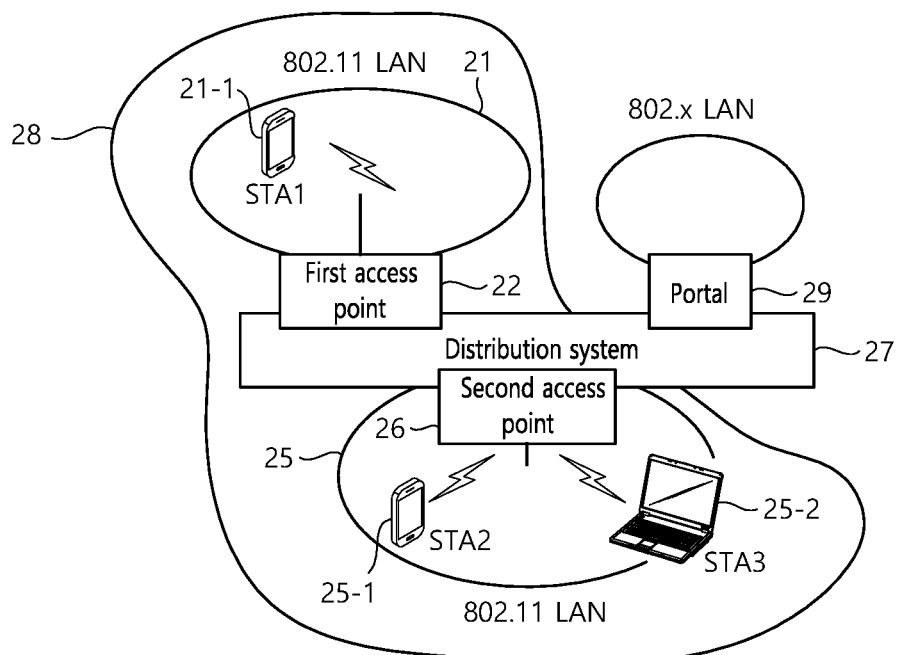
FIG. 3 is a conceptual diagram of a case where the wireless data transceiving system according to an embodiment of the present disclosure is implemented according to an IEEE 802.11 series communication protocol.
Figure 3:
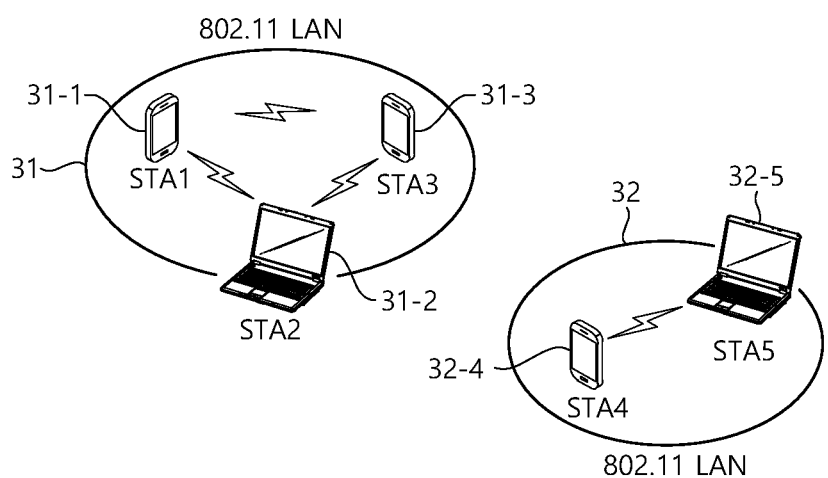

FIG. 3 is a conceptual diagram of a case where the wireless data transceiving system according to an embodiment of the present disclosure is implemented according to an IEEE 802.11 series communication protocol.

Referring to FIG. 3, a wireless data transceiving system 20 in (A) of FIG. 3 may include at least one basic service set (hereinafter referred to as 'BSS') 21 and 25. A BSS is a set consisting of an access point (hereinafter referred to as 'AP') and a station (STA) that are successfully synchronized and, thus, capable of communicating with each other. Herein, the BSS does not refer to a specific region (or area).

For example, a first BSS 21 may include a first AP 22 and one first STA 21-1. A second BSS 25 may include a second AP 26 and one or more STAs 25-1 and 25-2. Herein, the first AP 22 may correspond to the communication unit 1140 of FIG. 2, and the one or more STAs 25-1 and 25-2 may correspond to the communication unit 1210 of FIG. 2.

An infrastructure BSS 21 and 25 may include at least one STA, APs 22 and 26 providing a distribution service, and a distribution system (DS) 27 connecting multiple APs.

The distribution system 27 may implement an extended service set (hereinafter referred to as 'ESS') 28, which is extended by being connected to multiple BSSs 21 and 25. The ESS 28 may be used as a term indicating one network that is configured by connecting one or more APs 22 and 26 through the distribution system 27. At least one AP being included in one ESS 28 may have a same service set identification (hereinafter referred to as 'SSID').

A portal 29 may perform the role of a bridge, which connects the wireless LAN network (IEEE 802.11) with another network (e.g., 802.X).

In a WLAN having the structure shown in (A) of FIG. 3, a network between the APs 22 and 26 and a network between the APs 22 and 26 and the STAs 21-1, 25-1, and 25-2 may be implemented.

Meanwhile, unlike the system shown in (A) of FIG. 3, the wireless data transceiving system 30 shown in (B) of FIG. 3 may be capable of performing communication by establishing a network between the STAs without any APs 22 and 26. A network that is capable of performing communication by establishing a network between the STAs without any APs 22 and 26 is defined as an Ad-Hoc network or an independent basic service set (hereinafter referred to as 'IBSS').

Referring to (B) of FIG. 3, the wireless data transceiving system 30 is a BSS that operates in the Ad-Hoc mode, i.e., an IBSS. Since the IBSS does not include any AP, a centralized management entity that performs a management function at the center does not exist. Therefore, in the wireless data transceiving system 30, STAs 31-1, 31-2, 31-3, 32-4, and 32-5 are managed in a distributed manner. Here, the STAs 31-1, 31-2, 31-3, 32-4, and 32-5 may correspond to the communication unit 1140 or the communication unit 1210 of FIG. 2.

All STAs 31-1, 31-2, 31-3, 32-4, and 32-5 included in the IBSS may be configured as mobile STAs and are not allowed to access a distributed system. All of the STAs included in the IBSS establish a self-contained network.

An STA that is mentioned in the present specification is a random functional medium including a medium access control (hereinafter referred to as 'MAC') and a physical layer interface for a wireless medium according to the regulations of the Institute of Electrical and Electronics Engineers (IEEE) 802.11 standard and may be used to broadly refer to both an AP and a non-AP STA.

An STA that is mentioned in the present specification may be referred to by using various terms, such a mobile terminal, a wireless device, a wireless transmit/receive unit (WTRU), a user equipment (UE), a mobile station (MS), a mobile subscriber unit, and, simply, a user.

Referring back to FIG. 2, a communication channel that is established by the communication units 1140 and 1210 may be a network communication channel. In this case, the communication units 1140 and 1210 may establish a tunneled direct link setup (TDLS) in order to avoid or reduce network congestion. Wi-Fi Direct and TDLS are used for setting up relatively short-range communication sessions. The communication channel that establishes a wireless link 11 may be a communication channel of a relatively short range or a communication channel that is implemented by using a physical channel structure, such as Wi-Fi using a variety of frequencies including 2.4 GHz, 3.6 GHz, 5 GHz, 60 GHz, or ultra-wideband (UWB), Bluetooth, and so on.

While techniques disclosed in the present specification may generally be described in relation with communication protocols, such as the IEEE 802.11 series standard, it will be apparent that aspects of such techniques may also be compatible with other communication protocols. Illustratively and non-restrictively, wireless communication between the communication units 1140 and 1210 may use orthogonal frequency-division multiplexing (OFDM) schemes. Other various wireless communication schemes including, but not limited to, time-division multiple access (TDMA), frequency-division multiple access (FDMA), code-division multiple access (CDMA), or any random combination of OFDM, FDMA, TDMA, and/or CDMA may also be used.

The processors 1130 and 1230 may include an application-specific integrated circuit (ASIC), a different chipset, a logic circuit, and/or a data processor. The memories 1120 and 1220 may include a read-only memory (ROM), a random access memory (RAM), a flash memory, a memory card, a storage medium, and/or another storage device. The communication units 1140 and 1210 may include a baseband circuit for processing radio frequency signals. When an embodiment is implemented as software, the techniques described herein may be implemented as a module (e.g., a procedure, function, and so on) that performs the functions described in the present specification. The module may be stored in the memories 1120 and 1220 and may be executed by the processors 1130 and 1230. The memories 1120 and 1220 may be implemented inside the processors 1130 and 1230. Alternatively, the memories 1120 and 1220 may be implemented outside of the processors 1130 and 1230, and the memories 1120 and 1220 may be communicatively connected to the processors 1130 and 1230 via various well-known means that are disclosed in this technical field.

In light of a wireless communication system (i.e., WLAN, Wi-Fi), the wireless data transmitting device 1100 may be referred to as an AP or a personal basic service set control point (PCP) station, and the wireless data receiving device 1200 may be referred to as an STA or a non-personal basic service set control point (non-PCP) station.

In light of the input/output of a data stream, the wireless data transmitting device 1100 may be referred to as a wireless source device that wirelessly provides a source, and the wireless data receiving device 1200 may be referred to as a wireless sink device that wirelessly receives a source. The wireless source device and the wireless sink device may implement wireless display (WD) communication technologies that are compatible with standards such as wireless HD, wireless home digital interface (WHDI), WiGig, wireless USB, and Wi-Fi display (WFD, which also known as Miracast).

In light of the applications, the wireless data transmitting device 1100 may be integrated to a form that configures part of a wireless set-top box, a wireless gaming console, a wireless digital video disc (DVD) player, a wireless router, or the like. In this case, the wireless data transmitting device 1100 may be provided as a wireless communication module or a chip. And, the wireless data receiving device 1200 may be integrated to a form that configures part of a user device or electronic device (e.g., a wireless TV, a wireless monitor, a wireless projector, a wireless printer, a wireless vehicle dashboard display, a wearable device, an augmented-reality (AR) headset, a virtual-reality (VR) headset, or the like) having a display panel so as to display an image and a video.

In this case, the wireless data receiving device 1200 may be provided in the form of a wireless communication module or chip.

The wireless data transmitting device 1100 and the wireless data receiving device 1200 may be integrated to forms that configure parts of a mobile device. For example, the wireless data transmitting device 1100 and the wireless data receiving device 1200 may be integrated into a mobile terminal including a smartphone, a smartpad, a tablet PC, or other types of wireless communication devices, a portable computer having a wireless communication card, a personal digital assistant (PDA), a portable media player, a digital image capturing device, such as a camera or camcorder, or other flash memory devices having wireless communication capabilities. In this case, the wireless data transmitting device 1100 and the wireless data receiving device 1200 may be provided in the form of wireless communication modules or chips.

Smartphone users may perform streaming or mirroring of a video and an audio, which are outputted by the users' smartphones, tablet PCs, or other computing devices, to another device, such as a television or a projector, in order to provide a higher resolution display or other enhanced user experience.

Figure 4:
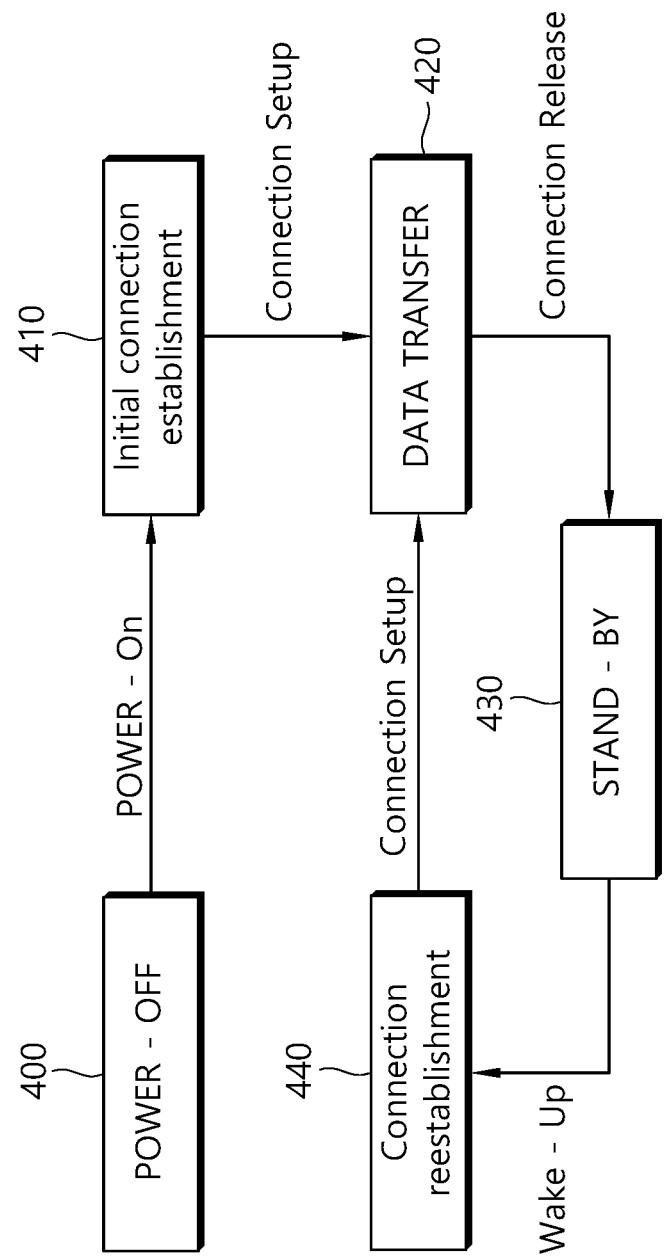
FIG. 4 shows a machine state of a wireless AV system according to an embodiment of the present disclosure.

FIG. 4 shows a machine state of a wireless AV system according to an embodiment of the present disclosure.

Referring to FIG. 4, a wireless AV system may enter or operate in a power off mode 400, an initial connection establishment mode 410, a data transfer mode 420, a stand-by mode 430, and a connection re-establishment mode 440. The initial connection establishment mode may also be referred to as an initial wakeup mode, and the connection re-establishment mode may also be simply referred to as a connection establishment mode.

The operation mode of the wireless AV system may be changed or transitioned (or shifted) in accordance with a direction of the arrows. For example, the wireless AV system may operate in the power off mode 400. Thereafter, when power is applied to the wireless AV system, the wireless AV system may enter or shift to the initial connection establishment mode 410. Additionally, the wireless AV system may operate in the initial connection establishment mode 410, and, when connection setup is completed, the wireless AV system may enter or shift to the data transfer mode 420. Additionally, the wireless AV system may operate in the data transfer mode 420, and, when the wireless AV system is deactivated, connection is cancelled (or the wireless AV system is disconnected), and the wireless AV system may enter or shift to the stand-by mode 430. Additionally, the wireless AV system may operate in the stand-by mode 430, and, when the wireless AV system is activated, the wireless AV system wakes up and may, then, enter or shift to the connection re-establishment mode 440. Furthermore, the wireless AV system may operate in the connection re-establishment mode 440, and, when connection setup is completed, the wireless AV system may, once again, enter or shift to the data transfer mode 420.

Since the wireless AV system may be configured of a wireless data transmitting device and a wireless data receiving device, a state machine according to FIG. 4 may be identically applied to each device. That is, each of the wireless data transmitting device and the wireless data receiving device may enter or operate in a power off mode 400, an initial connection establishment mode 410, a data transfer mode 420, a stand-by mode 430, and a connection re-establishment mode 440. Furthermore, the mode shift or entering of the wireless data transmitting device and the wireless data receiving device may also be carried out according to the same method as the above-described mode shift or entering of the wireless AV system.

The operation of the wireless data transmitting device for each mode may be performed by the main controller 130 of FIG. 1 or the processor 1130 of FIG. 2, and by the wireless communication unit 140 of FIG. 1 or the communication unit 1140 of FIG. 2.

Additionally, the operation of the wireless data receiving device for each mode may be performed by the panel controller 230 of FIG. 1 or the processor 1230 of FIG. 2, and by the wireless communication unit 210 of FIG. 1 or the communication unit 1210 of FIG. 2.

In the present specification, activation of the wireless data transmitting device may include operations or functions or meanings according to various embodiments. As an example, the activation of the wireless data transmitting device may include an operation of turning on a picture-related data transmission function (turn on operation). As another example, the activation of the wireless data transmitting device may include an operation of receiving a power on signal from a remote controller and turning on the power of the wireless data transmitting device (power on operation).

In the present specification, deactivation of the wireless data transmitting device may include operations or functions or meanings according to various embodiments. As an example, the deactivation of the wireless data transmitting device may include an operation of turning off a picture-related data transmission function (turn off operation). As another example, the deactivation of the wireless data transmitting device may include an operation of receiving a power off signal from a remote controller and turning on the power of the wireless data transmitting device (power off operation). In any case, even if the wireless data transmitting device is deactivated, the communication unit of the wireless data transmitting device is normally operated. And, therefore, basic communication between the wireless data transmitting device and the wireless data receiving device may continue to be maintained.

The activation or deactivation of the wireless data transmitting device may be detected and managed by the main controller 130 of FIG. 1 or the processor 1130 of FIG. 2.

In the present specification, activation of the wireless data receiving device may include operations or functions or meanings according to various embodiments. As an example, the activation of the wireless data receiving device may include an operation of turning on a picture-related data reception function (turn on operation). As another example, the activation of the wireless data receiving device may include an operation of receiving a power on signal from a remote controller and turning on the power of the wireless data receiving device (power on operation). As yet another example, the activation of the wireless data receiving device may include an operation of turning on the power of a display unit (power on operation).

In the present specification, deactivation of the wireless data receiving device may include operations or functions or meanings according to various embodiments. As an example, the deactivation of the wireless data receiving device may include an operation of turning off a picture-related data reception function (turn off operation). As another example, the deactivation of the wireless data receiving device may include an operation of receiving a power off signal from a remote controller and turning off the power of the wireless data receiving device (power off operation). As yet another example, the deactivation of the wireless data receiving device may include an operation of turning off the power of a display unit (power off operation). In any case, even if the wireless data receiving device is deactivated, the communication unit of the wireless data receiving device is normally operated. And, therefore, basic communication between the wireless data transmitting device and the wireless data receiving device may continue to be maintained.

The activation or deactivation of the wireless data receiving device may be detected and managed by the panel controller 230 of FIG. 1 or the processor 1230 of FIG. 2.

Hereinafter, a design direction of a beacon interval for each mode and a detailed communication procedure in each mode will be disclosed in more detail. In the present specification, the beacon interval design direction and detailed communication procedure for each mode will be described, for example, as shown below in Table 1.

TABLE 1

| Mode | Beacon interval design direction | Detailed communication procedure |
|---|---|---|
| Initial connection establishment mode | Minimize video data transmission delay between wireless data receiving device and transmitting device | BSS initialization and join Initial sector level sweep (SLS) and MIMO beamforming setup Association |
| Data transfer mode | Minimize unnecessary frame transmission for maximizing data transmission rate Ensure minimum idle time for regulation and occupy DMG channel Wireless data transmitting device/ receiving device transfer(s) Deactivation (or Power-Off) event to peer station(s) | Data transfer Beamformed link maintenance Disassociation |
| Stand-by mode | Perform only minimum operations needed for connection setup Measure channel metric for preferred channel selection Minimize consumed power during maintenance time Receive DMG beacon frame Wireless data transmitting device/receiving device transfer(s) Activation (or Power-On) event to peer station(s) | DMG beacon frame monitoring DMG channel measurement Power management |
| Connection reestablishment mode | Receive Activation (or Power-On) event during Stand-by mode, and minimize video data transmission delay between wireless data receiving device and transmitting device | Initial SLS and MIMO beamforming setup Association BSS initialization with preferred channel |

Table 1 is merely an example of the beacon interval design direction and detailed communication procedure for each mode, and it will be apparent that each detailed communication procedure may be designed to correspond to a different mode.

Initial Connection Establishment Mode

Figure 5:
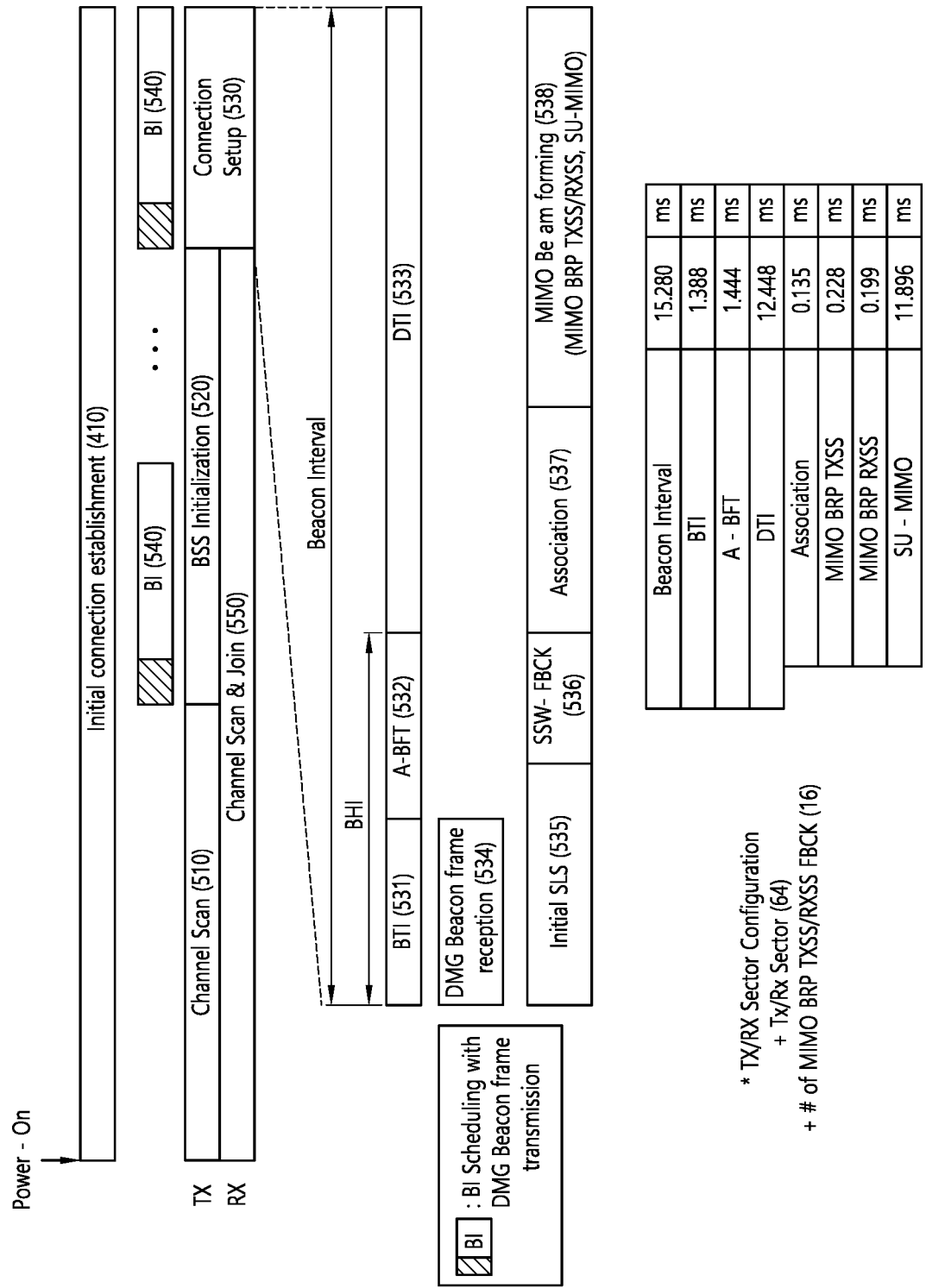
FIG. 5 is a conceptual diagram of a detailed communication procedure between a wireless data transmitting device and a wireless data receiving device in an initial connection establishment mode according to an embodiment.

FIG. 5 is a conceptual diagram of a detailed communication procedure between a wireless data transmitting device and a wireless data receiving device in an initial connection establishment mode according to an embodiment.

Referring to FIG. 5, when power of a wireless data transmitting device (hereinafter referred to as 'TX') and a wireless data receiving device (hereinafter referred to as 'RX') is initially turned on (i.e., initial power-on), the TX and RX enter an initial connection establishment mode for connection setup. Herein, the initial power-on operation of the TX may correspond to an operation of turning on the power of a communication unit that is equipped in the TX. Additionally, the initial power-on operation of the RX may correspond to an operation of turning on the power of a communication unit that is equipped in the RX. In the following embodiment, the communication unit that is equipped in the TX corresponds to the wireless communication unit 140 of FIG. 1 or the communication unit 1140 of FIG. 2. And, the communication unit that is equipped in the RX corresponds to the wireless communication unit 210 of FIG. 1 or the communication unit 1210 of FIG. 2.

In the initial connection establishment mode 410, the communication unit of the TX may perform channel scan 510, BSS initialization 520, and connection setup 530.

The channel scan 510 includes a step of selecting, by the communication unit of the TX, a directional multi-gigabit (DMG) channel, and a step of transmitting, by the communication unit of the TX, a DMG beacon frame 540 including information related to a BSS to the RX, at a beacon interval (BI) period, over the selected DMG channel. Herein, the DMG channel selection that is performed by the communication unit of the TX may, for example, be performed identically as the flowchart of FIG. 24. And, the DMG channel selection that is performed by the communication unit of the RX may, for example, be performed identically as the flowchart of FIG. 25.

When channel bonding is supported, the selected DMG channel may correspond to a bonding of a primary channel and a secondary channel. Additionally, the DMG beacon frame 540 may include association ready information indicating whether or not the TX communication unit is ready for association. For example, the association ready information is assigned with 1 bit, and when the bit value indicates 1, this may indicate that the TX communication unit is ready for association. And, when the bit value indicates 0, this may indicate that the TX communication unit is not ready for association. The association ready information is related to the activation/deactivation of the TX. For example, when the TX is activated, a processor of the TX notifies the activation of the TX to the TX communication unit, and the TX communication unit may set the association ready information to 1 and transmit the corresponding information. Conversely, when the TX is deactivated, the processor of the TX notifies the deactivation of the TX to the TX communication unit, and the TX communication unit may set the association ready information to 0 and transmit the corresponding information.

The connection setup 530 may include a step of transmitting, by the TX communication unit, a DMG beacon frame 540 at a beacon transmission interval (BTI) 531 from which the beacon interval starts, thereafter, a step of transmitting an association-beamforming training (A-BFT), a step of performing association 537 with the RX at a data transmission interval (DTI) 533, after a beacon header interval (BHI), which is configured of the BTI and A-BFT, and a step of performing MIMO beamforming setup 538. Herein, when performing connection setup, the association may be achieved with no authentication between the TX and the RX. Additionally, the connection setup 530 may further include a step of selecting, by the TX communication unit, a preferred DMG channel. Herein, depending upon the situation, the MIMO beamforming setup may be skipped.

The TX communication unit may transmit a DMG beacon frame through both the primary channel and the secondary channel that are allocated to the TX based on channel bonding. This prevents another PCP or station from receiving the DMG beacon frame and performing BSS initialization and data transmission in the corresponding DMG channel.

Meanwhile, in the initial connection establishment mode 410, the communication unit of the RX may perform channel scan & join 550, and connection setup 530.

The channel scan & join 550 includes a step of searching and receiving, by the RX communication unit, a DMG beacon frame 534 including information on the BSS that is transmitted from the TX at a beacon interval, and a step of joining the BSS, when the DMG beacon frame search and reception is successful. Herein, the channel scan & join 550 may further include a step of performing, by the RX communication unit, monitoring of a DMG channel and DMG channel measurement.

The connection setup 530 includes a step of performing, by the RX communication unit, sector level sweep (SLS) 535 based on the DMG beacon frame and sector sweep feedback (SSW-FBCK) 536, a step of performing association 537 with the TX, and a step of performing MIMO beamforming setup 538. Herein, depending upon the situation, the MIMO beamforming setup may be skipped.

The procedure related to the connection setup 530 will be described in more detail in FIG. 6.

Figure 6:
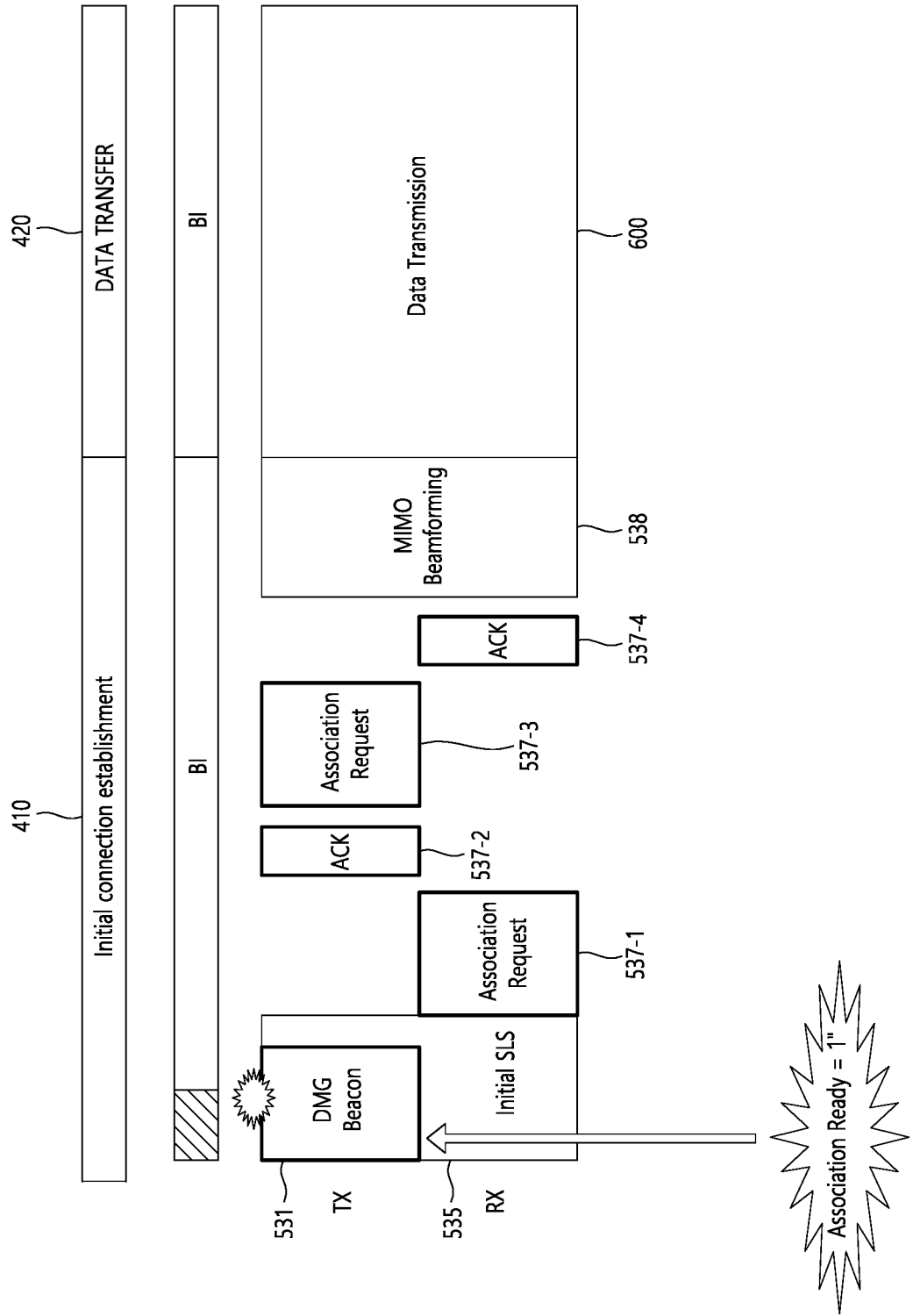
FIG. 6 is a conceptual diagram showing a connection setup between a wireless data transmitting device and a wireless data receiving device in an initial connection establishment mode according to an embodiment.

FIG. 6 is a conceptual diagram showing a connection setup between a wireless data transmitting device and a wireless data receiving device in an initial connection establishment mode according to an embodiment.

Referring to FIG. 6, when the communication unit of the TX transmits a DMG beacon frame 531 (including association ready information (Association ready)=1) to the communication unit of the RX, the RX communication unit performs initial SLS 535 based on the DMG beacon frame 531.

Thereafter, the TX communication unit and the RX communication unit perform connection setup 530.

The connection setup 530 includes a step of transmitting, by the RX communication unit, an association request frame 537-1 to the TX communication unit, a step of transmitting, by the TX communication unit, an ACK 537-2 for the association request frame and an association response frame 537-3 to the RX communication unit, and a step of transmitting, by the RX communication unit, an ACK 537-4 for the association response frame to the TX communication unit. Thus, the connection setup 530 may be completed.

After completing the connection setup in the initial connection establishment mode 410, the wireless AV system may shift to or enter a data transfer mode 420 and may perform data transmission 600.

Figure 7:
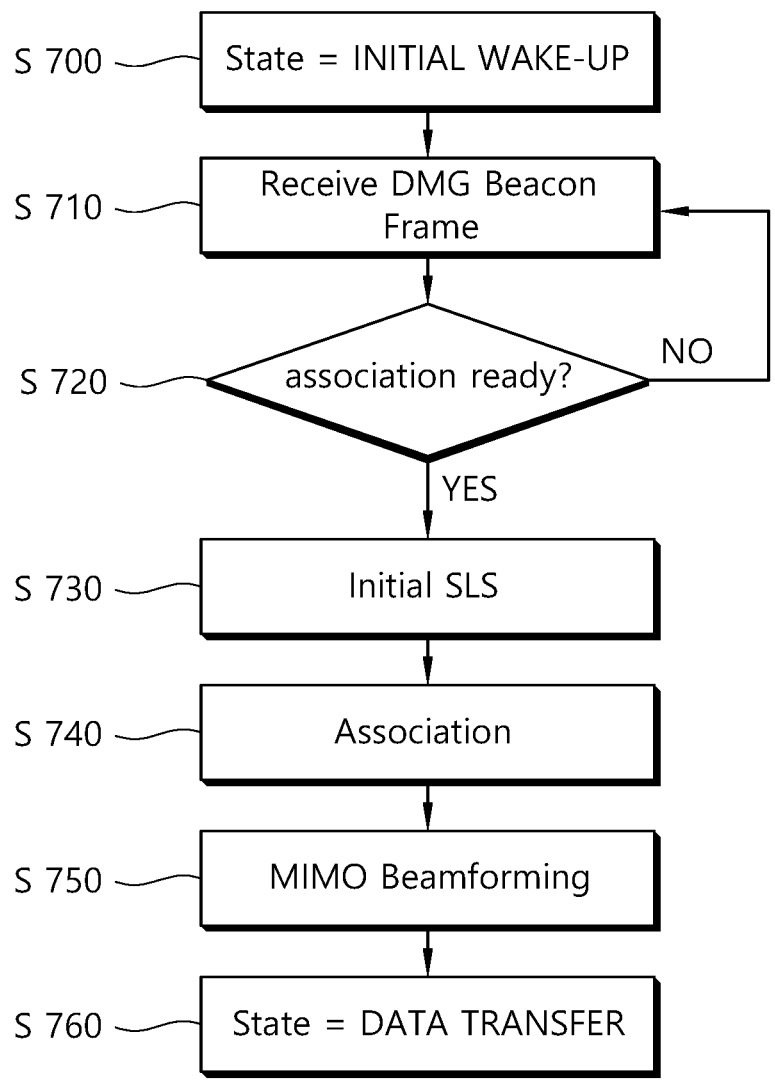
FIG. 7 is an operation flowchart of a wireless data receiving device in an initial connection establishment mode according to an embodiment.

FIG. 7 is an operation flowchart of a wireless data receiving device in an initial connection establishment mode according to an embodiment.

Referring to FIG. 7, when the power of the wireless data receiving device is turned on (S700), the wireless data receiving device receives a DMG beacon frame from a wireless data transmitting device (S710).

The wireless data receiving device verifies whether the wireless data transmitting device is in an association ready state, by using association ready information included in the DMG beacon frame (S720). If it is verified that the wireless data transmitting device is ready for association (i.e., association ready) (YES), the wireless data receiving device performs initial SLS (S730), performs association with the wireless data transmitting device (S740), and performs MIMO setup based on MIMO beamforming training (S750), and, when the connection setup is completed, the wireless data receiving device enters the data transfer mode (S760). If it is verified that the wireless data transmitting device is not ready for association (NO), the wireless data receiving device monitors the DMG beacon once again (S710). Herein, depending upon the situation, the MIMO beamforming setup may be skipped.

Data Transfer Mode

Figure 8:
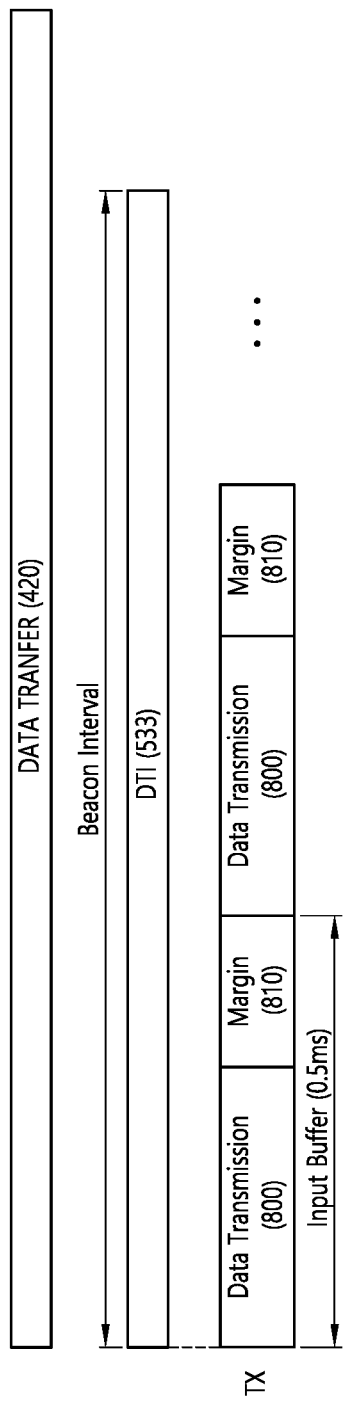
FIG. 8 is a conceptual diagram of a detailed communication procedure between a wireless data transmitting device and a wireless data receiving device in a data transfer mode according to an embodiment.

FIG. 8 is a conceptual diagram of a detailed communication procedure between a wireless data transmitting device and a wireless data receiving device in a data transfer mode according to an embodiment.

Referring to FIG. 8, in the data transfer mode 420, the communication unit of the TX alternately transmit a data frame 800 and a margin frame 810 corresponding to the data frame.

In the data transfer mode 420, the communication using of the RX receives the data frame 800 and the margin frame 810 corresponding to the data frame.

One data frame 800 and one margin frame 810 may correspond to an input buffer, and, for example, a time length of a MAC input buffer may be set to 0.5 ms. That is, a time duration during which the data frame 800 and the margin frame 810 are transmitted may be determined based on a length of the MAC input buffer.

The communication unit of the TX may transmit time stamp information each time a data frame is transmitted and may synchronize timing of the data frame based on the time stamp information. The communication unit of the RX may receive time stamp information each time a data frame is received and may synchronize timing of the data frame based on the time stamp information.

In the aspect that a beacon interval includes only a DTI 533 and does not include a BHI, the present embodiment has a different structure than that of a beacon interval according to the existing IEEE 802.11ad or ay. This has an effect of further increasing the data transmission rate by using approximately 2.85 ms that is required in a BHI, which should be transmitted at each beacon interval. Since the BHI is omitted and only the DTI exists in the beacon interval, in the data transfer mode, the beacon interval may be referred to as a modified beacon interval or a super-frame.

Due to the omission of the BTI, a gap may occur in a means for performing timing synchronization between the TX and the RX. However, this may be resolved by using an announce frame at an end point of the data transfer mode.

According to another embodiment, the communication unit of the TX may transmit time stamp information each time a data frame is transmitted. This is to align the minimum timing synchronization between the TX and the RX even in the data transfer mode. Since the TX communication unit only transmits time stamp information and does not transmit the entire DMG beacon frame, overhead bits related to the transmission of the entire DMG beacon frame may be saved.

Meanwhile, a margin frame is used for at least one of data re-transmission, beamformed link maintenance, and null frame transmission.

In the data transfer mode, in order to meet with the regulations, the support or non-support of a random back-off needs to be regulated.

For example, the wireless AV system supports a maximum channel occupancy time (Max channel occupancy time) 9 ms+control channel access (CCA) empty time 8 us. However, in order to meet with the transmission rate requirement of ~30 Gbps, random back-off may not be supported. An extended CCA check will be defined as shown below in the following table.

TABLE 2 a) An extended CCA check is initiated at end of operating channel occupied.
b) The transmission shall not start earlier than 8 μs while observing CCA empty.
c) The transmission deferring continues for a random number of empty slots period.
d) Random number: ranges from zero to a Max number not greater than 127.
e) Extended CCA Check Time equals b) + c), i.e. 8 μs + random (0 to 127) × 5 μs. Channel Occupancy Time shall be less than 9 ms, after which the device shall perform a new CCA Meanwhile, since the MAC processing time for each mode (or mode change) varies, as shown in Table 3, a variable super-frame structure may be operated in accordance with each mode.

TABLE 3

| Mode change | MAC processing time (ms) | Requirement |
|---|---|---|
| Power-On (Initial connection establishment mode −> Data transfer mode) | 458.4~ | MAC requirement (TBD) of wireless AV system/On-time (2.8 s) of 4K display panel |
| Deactivation (Data transfer mode −> Stand-by mode) | 15.3~ | |
| Activation (Stand-by mode −> Data transfer mode) | 30.6~ | |

A standard based on which the MAC processing time is calculated at each mode change according to Table 3 is as follows.

Initial connection establishment time=2*channel scan time (7 channels*scan time per channel (=2*BI duration)/channel)+BSS join & connection setup time (2*BI duration). Herein, BI duration=15.28 ms.

Deactivation time (Power-Off)=MAX{BI duration, Disassociation=0.2 ms (=disassociation frame+ACK frame+announce frame+ACK frame)+DMG beacon frame reception time}.

Activation time (Power-On)=2*BI duration.

Change from the Data Transfer Mode to the Stand-By Mode

A cause that triggers the wireless AV system to be changed from the data transfer mode to the stand-by mode is the deactivation of the wireless data transmitting device or receiving device. That is, the stand-by mode may be initiated by the deactivation of the wireless data transmitting device or receiving device.

Hereinafter, an embodiment of the stand-by mode being initiated by the deactivation of the wireless data transmitting device and an embodiment of the stand-by mode being initiated by the deactivation of the wireless data receiving device will be differentiated and described accordingly.

Figure 9:
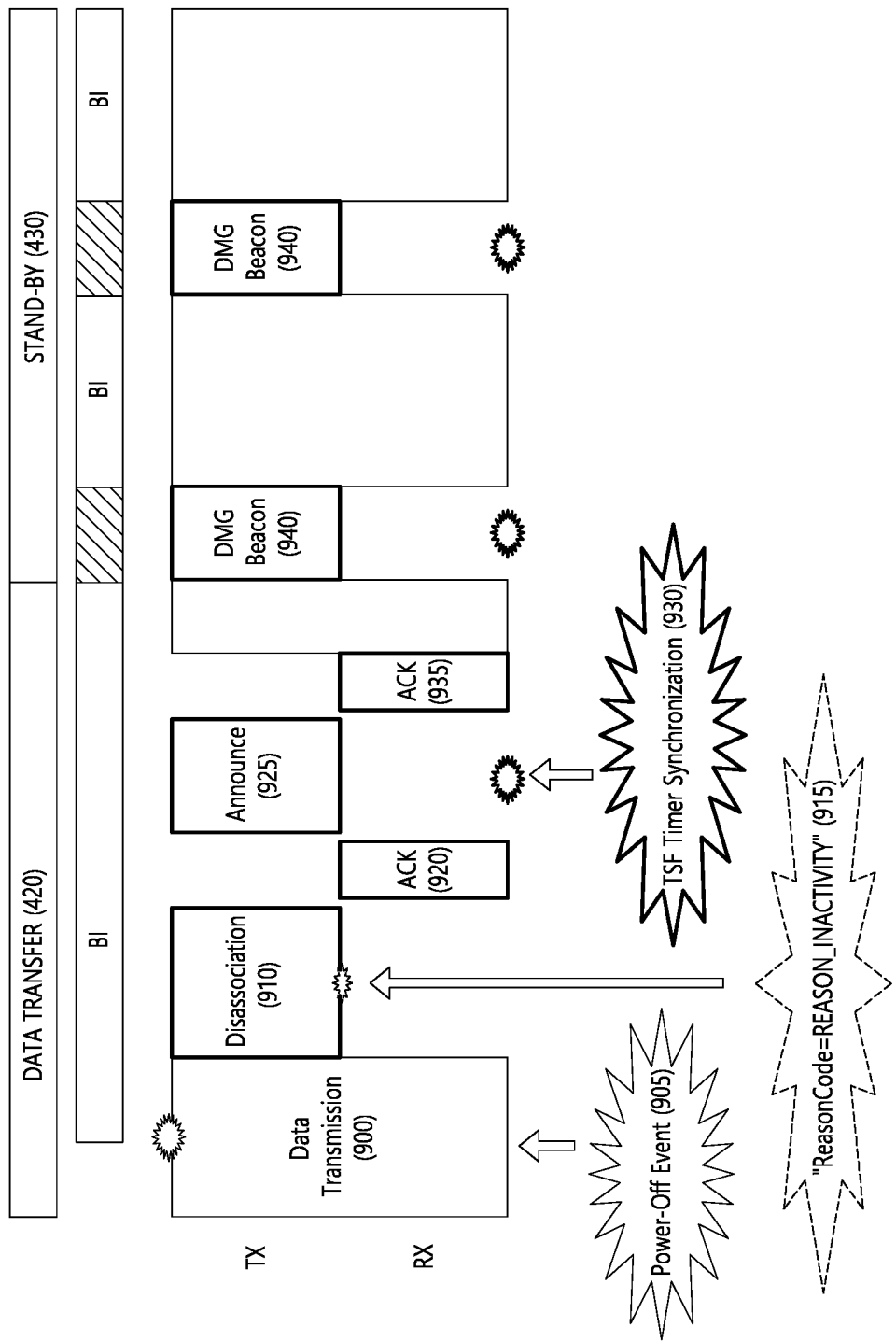
FIG. 9 is a conceptual diagram of a detailed communication procedure between a wireless data transmitting device and a wireless data receiving device, when a stand-by mode is initiated by a deactivation of the wireless data transmitting device.

FIG. 9 is a conceptual diagram of a detailed communication procedure between a wireless data transmitting device and a wireless data receiving device, when a stand-by mode is initiated by a deactivation of the wireless data transmitting device.

Referring to FIG. 9, in the data transfer mode 420, a TX communication unit performs transmission of video data, and an RX communication unit performs reception of video data 900. During the transmission/reception of the video data, if the TX communication unit is deactivated (i.e., power-off event 905), the TX communication unit transmits, to the RX communication unit, a disassociation frame 910 instructing disassociation of the TX communication unit from the RX communication unit. At this point, the TX communication unit may set a disassociation reason code, which is included in the disassociation frame 910, to "INACTIVITY". The RX communication unit receives the disassociation frame 910 from the TX communication unit, and the RX communication unit transmits an ACK frame 920, to the TX communication unit, as a response to the received disassociation frame 910.

The TX communication unit transmits an announce frame 925 for time synchronization function (TSF) timer synchronization 930 to the RX communication unit. For example, the announce frame 925 includes information on a location where the DMG beacon frame is transmitted. When the TX and the RX enter the stand-by mode, if the TSF timer is not synchronized, after being disassociated from the TX, the RX may not easily receive the DMG beacon frame from the TX. This is because a BHI is not provided in the data transfer mode. Therefore, before entering the stand-by mode, by transmitting in advance the announce frame 925 to the RX communication unit, the TX communication enables the RX communication unit to recognize a transmission point of the DMG beacon frame in the stand-by mode.

The RX communication unit transmits, to the TX communication unit, an ACK frame 935 as a response to the received announce frame 925 and enters the stand-by mode. After receiving the ACK frame 935, the TX communication unit also enters the stand-by mode. Thereafter, in the stand-by mode, the TX communication unit periodically transmits a DMG beacon frame 940 and maintains minimum communication connection with the RX communication unit in order to prepare for the wireless AV system being activated once again in a later process.

Figure 10:
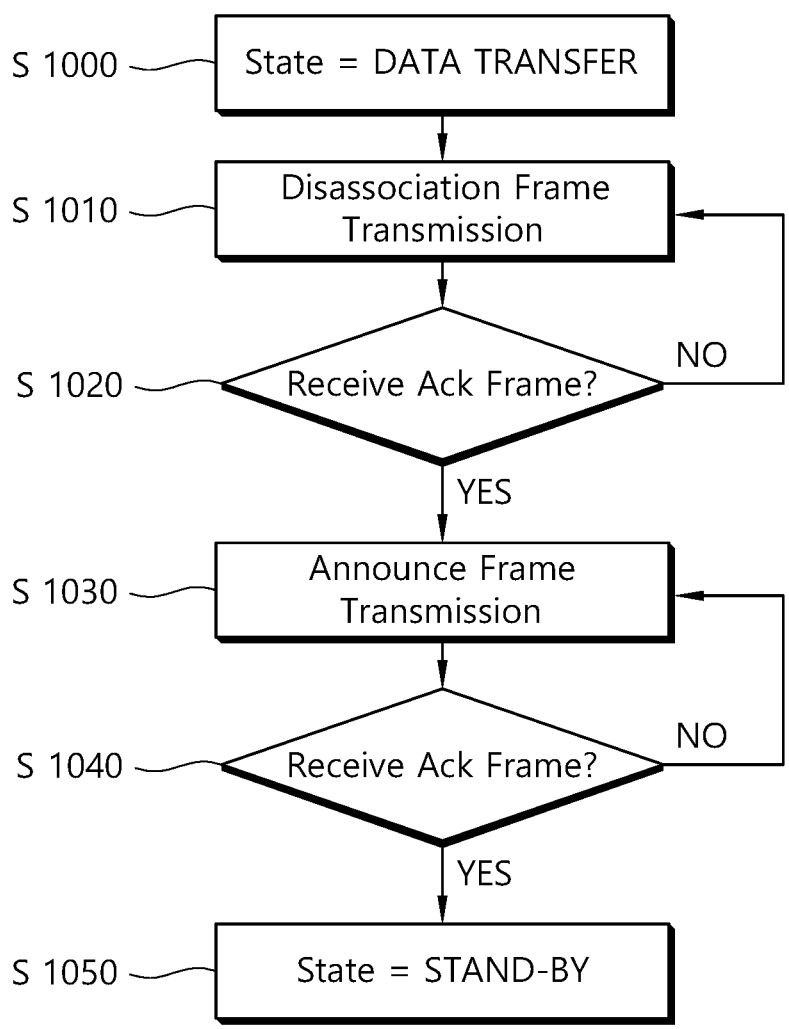
FIG. 10 is an operation flowchart of the wireless data transmitting device, when the stand-by mode is initiated by the deactivation of the wireless data transmitting device.

FIG. 10 is an operation flowchart of the wireless data transmitting device, when the stand-by mode is initiated by the deactivation of the wireless data transmitting device.

Referring to FIG. 10, while operating in the data transfer mode (S1000), the TX transmits a disassociation frame, to the RX, due to the deactivation of the TX (S1010). At this point, the TX may set the disassociation reason code to "INACTIVITY".

The TX determines whether or not an ACK frame corresponding to the disassociation frame is correctly received from the RX (S1020). And, if the ACK frame is received, the TX transmits an announce frame to the RX (S1030).

The TX determines whether or not an ACK frame corresponding to the announce frame is correctly received from the RX (S1040). And, if the ACK frame is received, the TX enters the stand-by mode (S1050).

Figure 11:
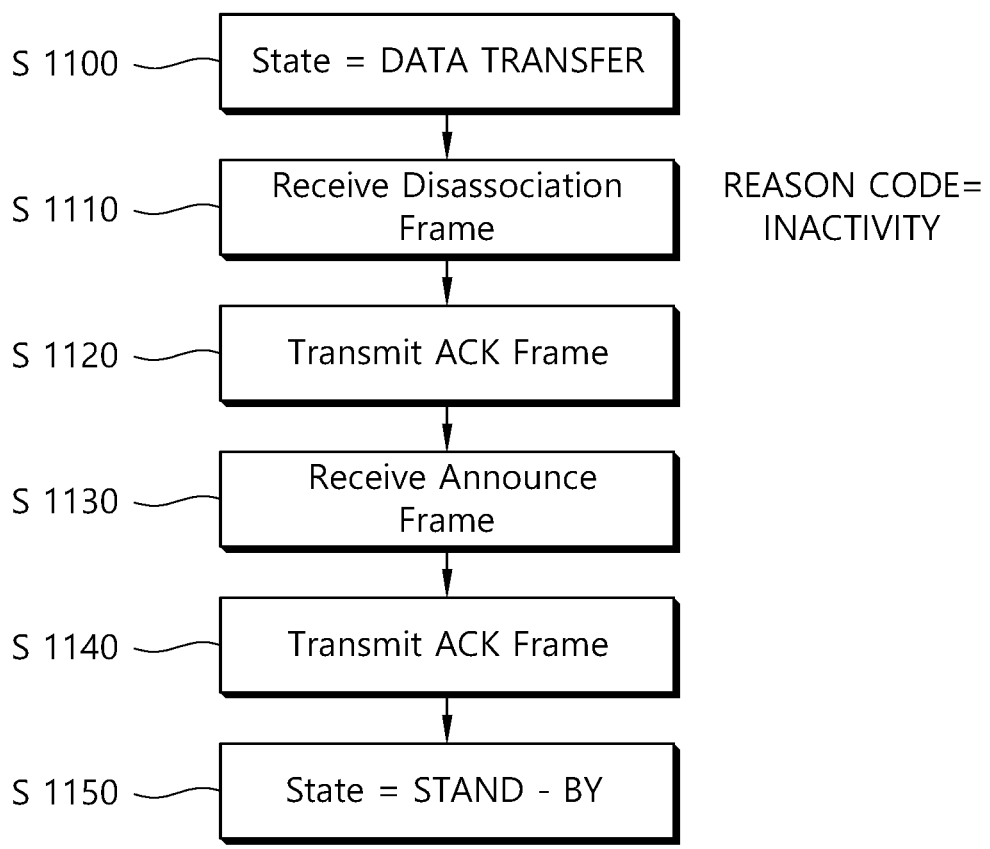
FIG. 11 is an operation flowchart of the wireless data receiving device, when the stand-by mode is initiated by the deactivation of the wireless data transmitting device.

FIG. 11 is an operation flowchart of the wireless data receiving device, when the stand-by mode is initiated by the deactivation of the wireless data transmitting device.

Referring to FIG. 11, while operating in the data transfer mode (S1100), the RX receives a disassociation frame, from the TX, due to the deactivation of the TX (S1110). At this point, the disassociation reason code indicates "INACTIVITY".

The RX transmits an ACK frame corresponding to the disassociation frame to the TX (S1120) and receives an announce frame from the TX (S1130). The RX transmits an ACK frame corresponding to the announce frame to the TX (S1140) and enters the stand-by mode (S1150).

Figure 12:
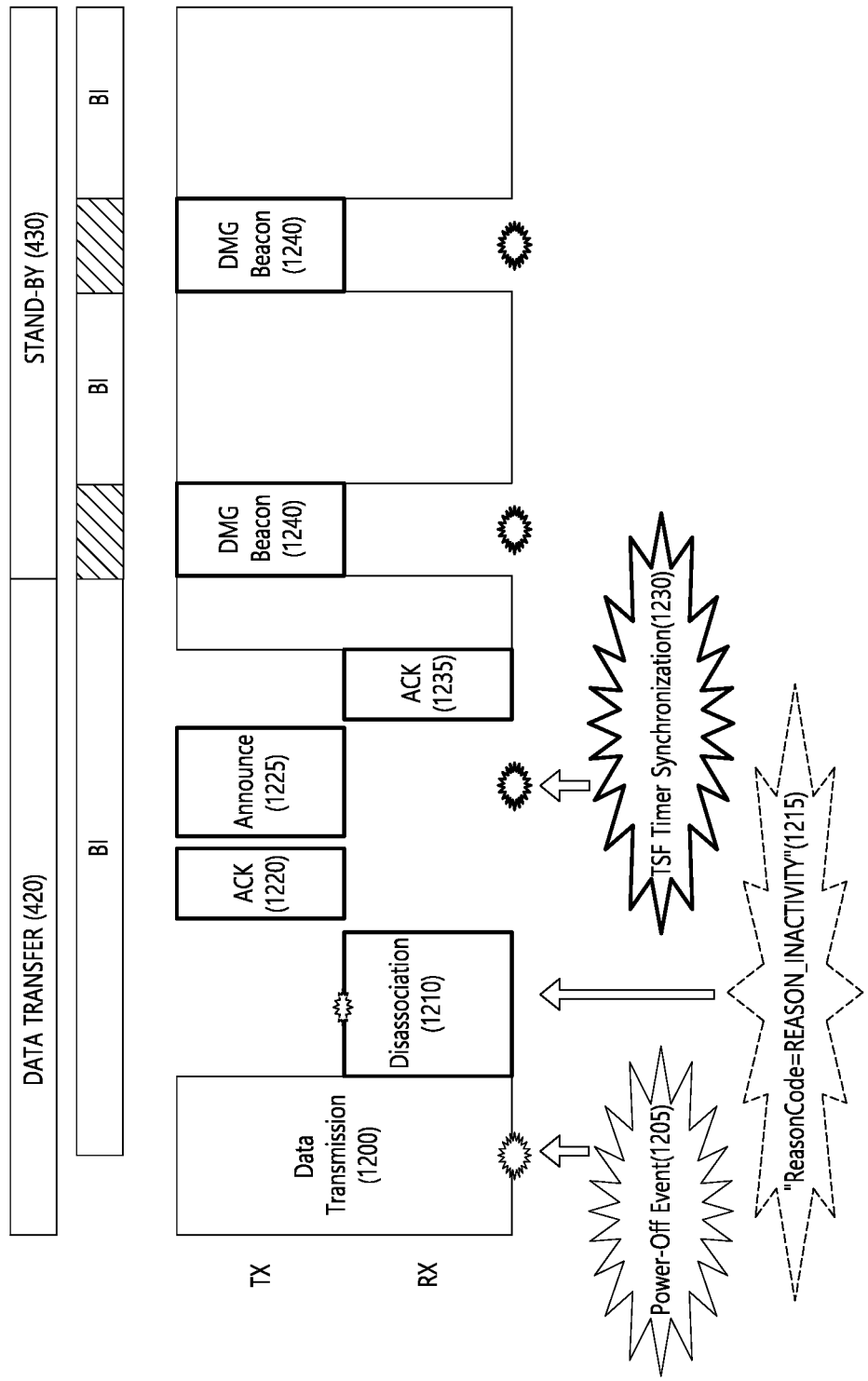
FIG. 12 is a conceptual diagram of a detailed communication procedure between a wireless data transmitting device and a wireless data receiving device, when a stand-by mode is initiated by a deactivation of the wireless data receiving device.

FIG. 12 is a conceptual diagram of a detailed communication procedure between a wireless data transmitting device and a wireless data receiving device, when a stand-by mode is initiated by a deactivation of the wireless data receiving device.

Referring to FIG. 12, in the data transfer mode 420, a TX communication unit performs transmission of video data, and an RX communication unit performs reception of video data 1200. During the transmission/reception of the video data, if the RX is deactivated (i.e., power-off event 1205), the RX communication unit transmits, to the TX communication unit, a disassociation frame 1210 instructing disassociation of the RX communication unit from the TX communication unit. At this point, the RX communication unit may set a disassociation reason code, which is included in the disassociation frame 1210, to "INACTIVITY". The TX communication unit receives the disassociation frame 1210 from the RX communication unit, and the TX communication unit transmits an ACK frame 1220, to the RX communication unit, as a response to the received disassociation frame 1210.

The TX communication unit transmits an announce frame 1225 for time synchronization function (TSF) timer synchronization 1230 to the RX communication unit. For example, the announce frame 1225 includes information on a location where the DMG beacon frame is transmitted. When the TX and the RX enter the stand-by mode, if the TSF timer is not synchronized, after being disassociated from the TX, the RX may not easily receive the DMG beacon frame from the TX. This is because a BHI is not provided in the data transfer mode. Therefore, before entering the stand-by mode, by transmitting in advance the announce frame 1225 to the RX communication unit, the TX communication enables the RX communication unit to recognize a transmission point of the DMG beacon frame in the stand-by mode.

The RX communication unit transmits, to the TX communication unit, an ACK frame 1235 as a response to the received announce frame 1225 and enters the stand-by mode. After receiving the ACK frame 1235, the TX communication unit also enters the stand-by mode. Thereafter, in the stand-by mode, the TX communication unit periodically transmits a DMG beacon frame 1240 and maintains minimum communication connection with the RX communication unit in order to prepare for the wireless AV system being activated once again in a later process.

Figure 13:
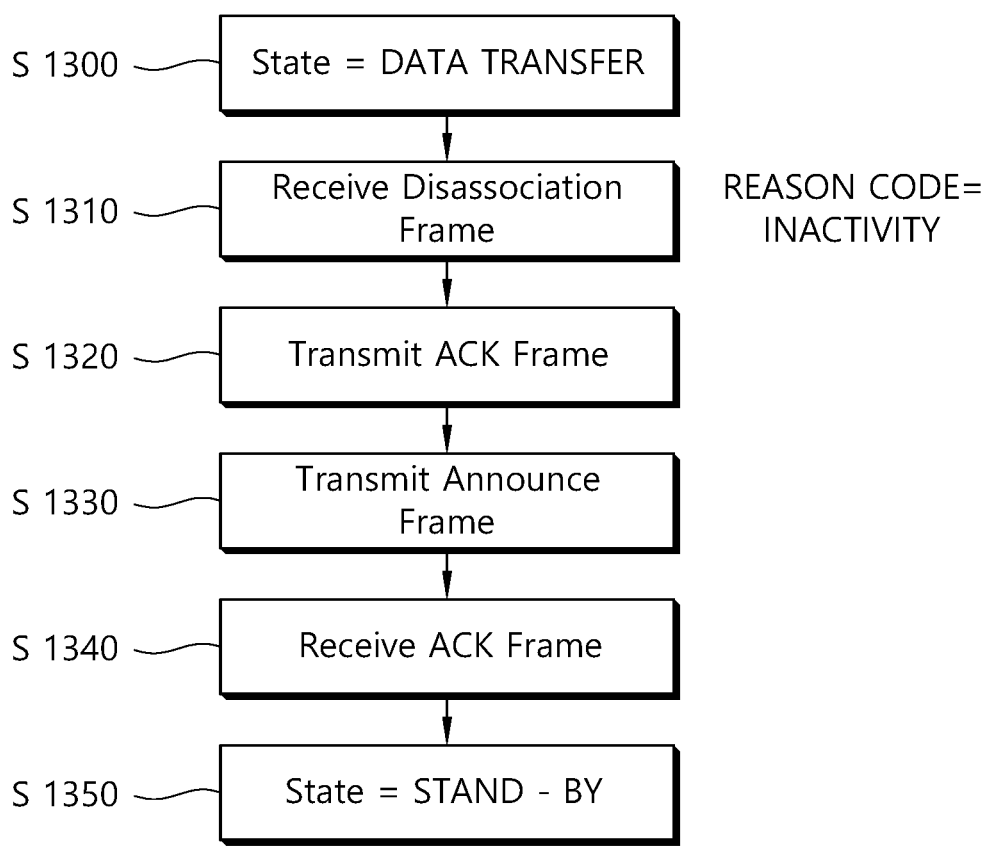
FIG. 13 is an operation flowchart of the wireless data transmitting device, when the stand-by mode is initiated by the deactivation of the wireless data receiving device.

FIG. 13 is an operation flowchart of the wireless data transmitting device, when the stand-by mode is initiated by the deactivation of the wireless data receiving device.

Referring to FIG. 13, while operating in the data transfer mode (S1300), the TX transmits a disassociation frame, to the RX, due to the deactivation of the TX (S1310). At this point, the disassociation reason code indicates "INACTIVITY".

The TX transmits an ACK frame corresponding to the disassociation frame to the RX (S1320). Thereafter, the TX transmits an announce frame to the RX (S1330). If an ACK frame corresponding to the announce frame is received (S1340), the TX enters the stand-by mode (S1350).

Figure 14:
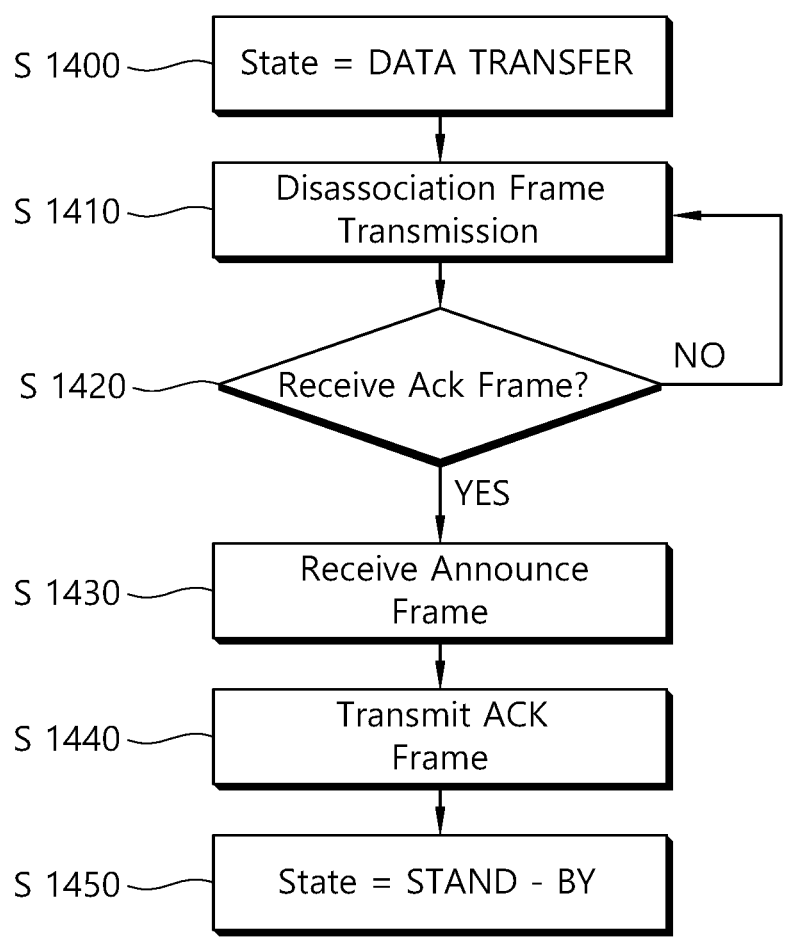
FIG. 14 is an operation flowchart of the wireless data receiving device, when the stand-by mode is initiated by the deactivation of the wireless data receiving device.

FIG. 14 is an operation flowchart of the wireless data receiving device, when the stand-by mode is initiated by the deactivation of the wireless data receiving device.

Referring to FIG. 14, while operating in the data transfer mode (S1400), the RX transmits a disassociation frame, to the TX, due to the deactivation of the RX (S1410). At this point, the RX may set the disassociation reason code to "INACTIVITY".

The RX determines whether or not an ACK frame corresponding to the disassociation frame is correctly received from the TX (S1420). And, if the ACK frame is received, the RX receives an announce frame from the TX (S1430).

The RX transmits an ACK frame corresponding to the announce frame to the TX (S1440) and enters the stand-by mode (S1450).

Stand-By Mode

Figure 15:
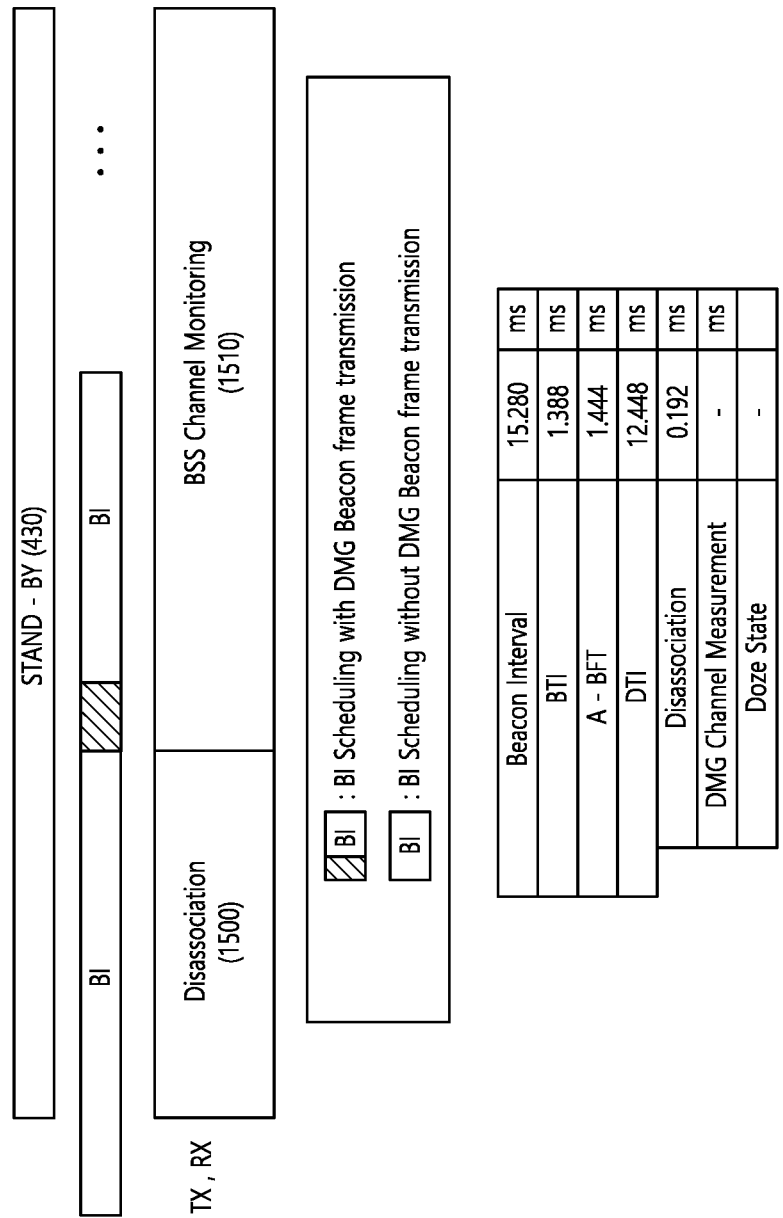
FIG. 15 is a conceptual diagram of a detailed communication procedure between a wireless data transmitting device and a wireless data receiving device in a stand-by mode according to an embodiment.

FIG. 15 is a conceptual diagram of a detailed communication procedure between a wireless data transmitting device and a wireless data receiving device in a stand-by mode according to an embodiment.

Referring to FIG. 15, in the stand-by mode 430, each of a communication unit of the TX and a communication unit of the RX performs BSS channel monitoring 1510. BSS channel monitoring 1510 may also be referred to as DMG channel monitoring. For example, the BSS channel monitoring 1510 may include an operation of performing DMG control channel access (CCA) by the TX communication unit and the RX communication unit. As another example, the BSS channel monitoring 1510 may include an operation of performing DMG channel measurement by the TX communication unit and the RX communication unit. As yet another example, the BSS channel monitoring 1510 may include an operation of performing power management by the TX communication unit and the RX communication unit.

In the stand-by mode 430, since video data is not exchanged between the TX and the RX, time resource for data transmission is not occupied by the wireless AV system. In this case, the corresponding time resource may be occupied by a hidden node, and when the wireless AV system is activated once again, a situation may occur where the resource needed for the wireless AV system to enter the data transfer mode cannot be ensured in a timely manner. Therefore, in the stand-by mode 430, the RX communication unit may verify whether or not a DTI is occupied by another device through BSS channel monitoring in a DTI within a BI. Similarly, in the stand-by mode 430, the TX communication unit may verify whether or not a DTI is occupied by another device through BSS channel monitoring in a DTI within a BI. A more detailed conceptual diagram of the BSS channel monitoring procedure is shown in FIG. 16.

Figure 16:
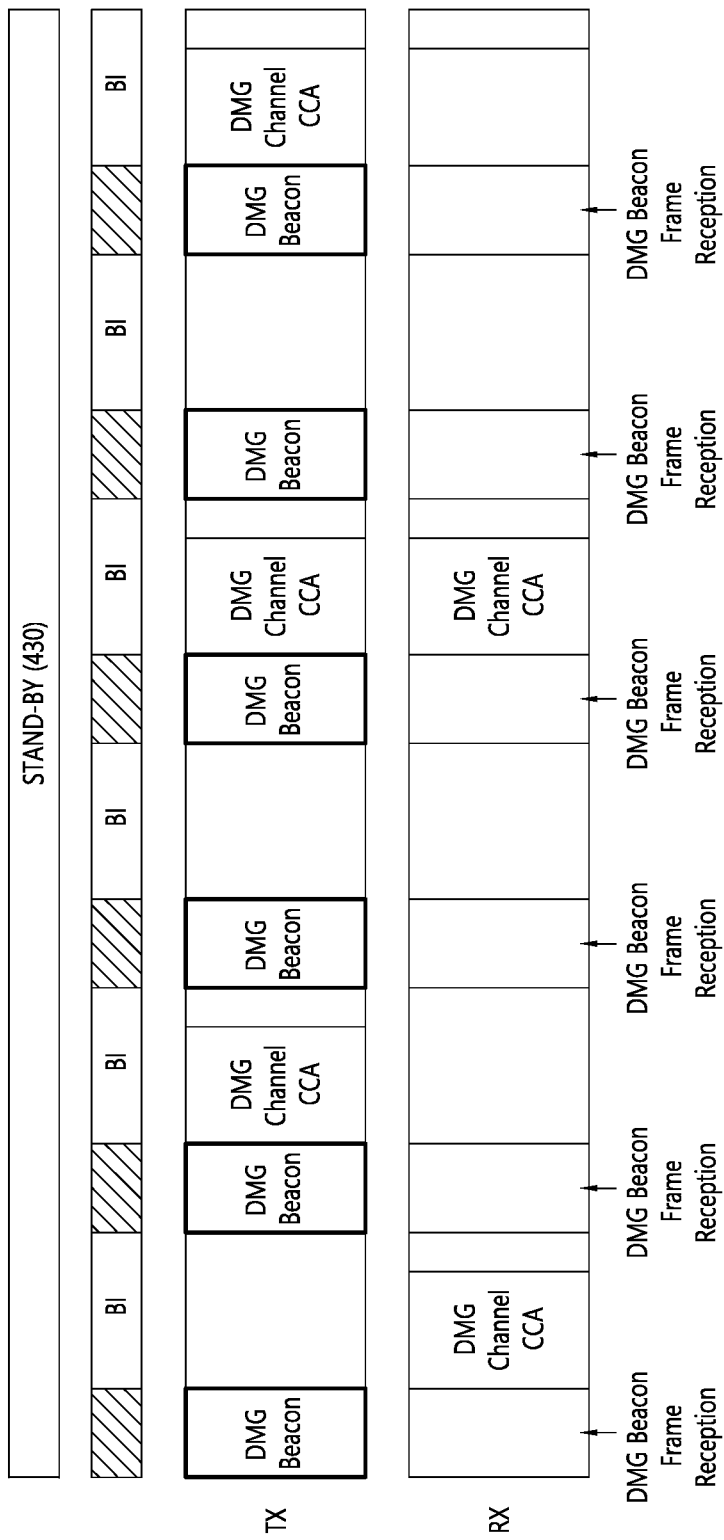
FIG. 16 is a conceptual diagram showing a BSS channel monitoring procedure between a wireless data transmitting device and a wireless data receiving device in a stand-by mode according to an embodiment.

FIG. 16 is a conceptual diagram showing a BSS channel monitoring procedure between a wireless data transmitting device and a wireless data receiving device in a stand-by mode according to an embodiment.

Referring to FIG. 16, in the stand-by mode 430, the TX communication unit transmits, to the RX communication unit, a DMG beacon frame including information on a BSS at each beacon interval (BI) during a time duration (or time period) that is scheduled to transmit a DMG beacon frame, i.e., BTI. Before entering the stand-by mode 430, timing synchronization is already achieved between the RX and the TX based on TSF timer synchronization of an announce frame. Therefore, after entering the stand-by mode 430, the RX communication unit may receive a DMG beacon frame during a BTI of each beacon interval from the TX communication unit.

The DMG beacon frame may include association ready information indicating whether or not the TX is ready for association. For example, the association ready information is assigned with 1 bit, and when the bit value indicates 1, this may indicate that the TX is ready for association. And, when the bit value indicates 0, this may indicate that the TX is not ready for association. The association ready information is related to the activation/deactivation of the TX. For example, when the TX is activated, a processor of the TX notifies the activation of the TX to the TX communication unit, and the TX communication unit may set the association ready information to 1 and transmit the corresponding information. Conversely, when the TX is deactivated, the processor of the TX notifies the deactivation of the TX to the TX communication unit, and the TX communication unit may set the association ready information to 0 and transmit the corresponding information.

The RX communication unit may perform DMG channel measurement during a time duration (or time period) that is not scheduled to transmit a DMG beacon frame, i.e., DTI. During the stand-by mode 430, a wireless channel that is used by the wireless AV system may be changed due to factors related to the surrounding environment, such as changes in TX or RX deployment (or positioning). Therefore, when the wireless AV system returns to the data transfer mode so as to perform video data transmission, the DMG channel measurement is carried out in order to ensure an optimal preferred channel at a minimum time delay. A DMG channel measurement range may include not only the channel through which the current DMG beacon frame is being transmitted but also other channels.

That is, the RX communication unit may monitor the DMG beacon frame during a first time duration (BTI), during which a DMG beacon frame transmission performed by the TX communication unit is scheduled, and may perform DMG channel measurement during a second time duration (DTI), during which the DMG beacon frame transmission is not scheduled.

The TX communication unit also performs BSS channel monitoring during a time duration, during which the DMG beacon frame transmission is not scheduled, i.e., DTI. And, by doing so, the TX communication unit may prepare in advance a preferred channel.

The TX communication unit and the RX communication unit may perform BSS channel monitoring during different DTIs or during the same DTI.

Chance from the Stand-By Mode to the Connection Re-Establishment Mode

A cause that triggers the wireless AV system to be changed from the stand-by mode to the connection re-establishment mode is the activation of the wireless data transmitting device or receiving device. That is, the connection re-establishment mode may be initiated by the activation of the wireless data transmitting device or receiving device.

Hereinafter, an embodiment of the connection re-establishment mode being initiated by the activation of the wireless data transmitting device and an embodiment of the connection re-establishment mode being initiated by the activation of the wireless data receiving device will be differentiated and described accordingly.

Figure 17:
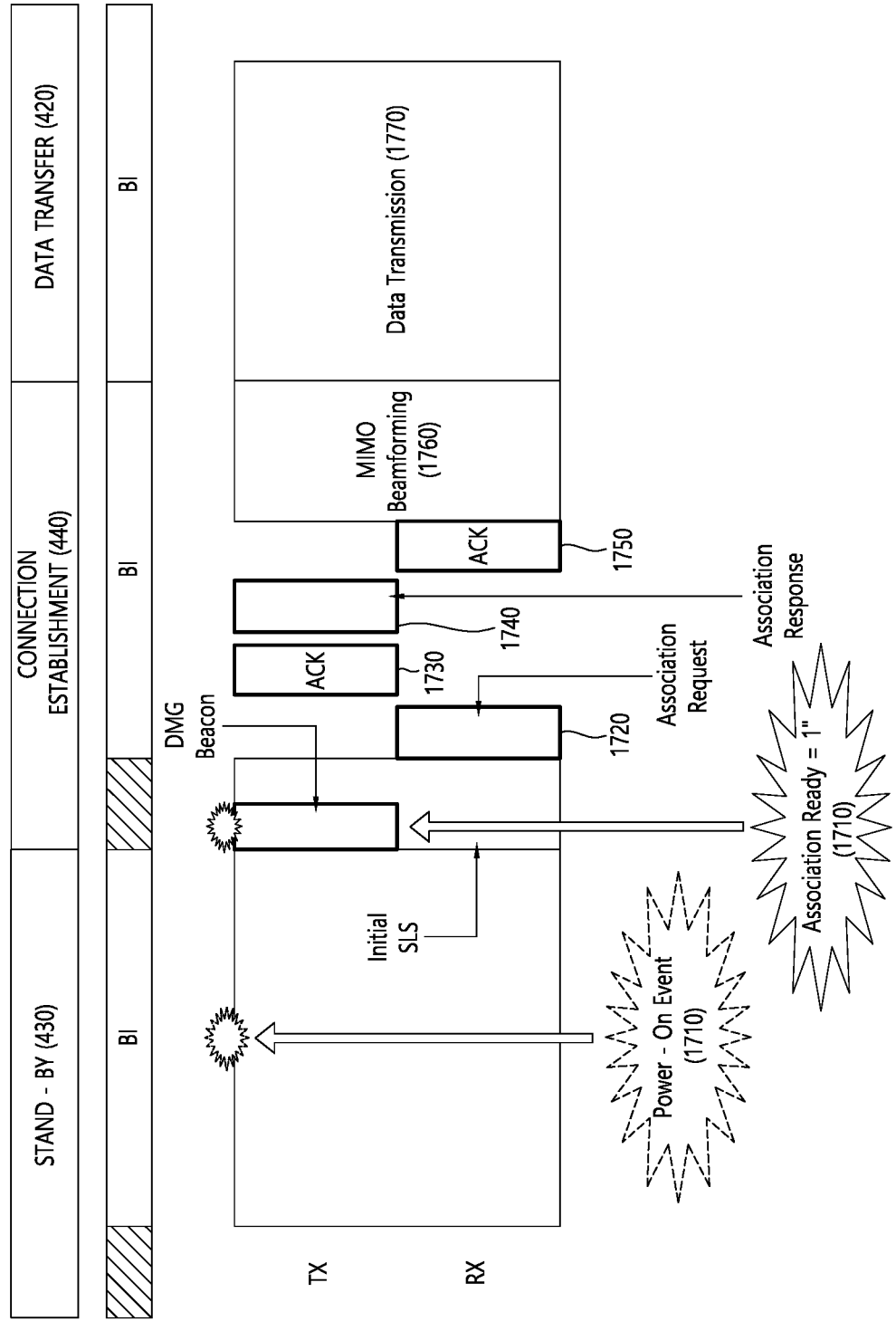
FIG. 17 is a conceptual diagram of a detailed communication procedure between a wireless data transmitting device and a wireless data receiving device, when a connection re-establishment mode is initiated by an activation of the wireless data transmitting device.

FIG. 17 is a conceptual diagram of a detailed communication procedure between a wireless data transmitting device and a wireless data receiving device, when a connection re-establishment mode is initiated by an activation of the wireless data transmitting device.

Referring to FIG. 17, if the TX is activated (i.e., power-on event 1700) while operating in the stand-by mode 430, a processor of the TX notifies the activation of the TX to the TX communication unit. The TX communication unit sets the association ready information to 1, and, then, the TX communication unit transmits a DMG beacon frame 1710 including the association ready information to the RX communication unit at a next beacon interval. Thus, the wireless AV system enters the connection re-establishment mode 440.

In the connection re-establishment mode 440, the RX communication unit receives a DMG beacon frame 1710 from the TX communication unit. And, after performing initial SLS, as a response to the received DMG beacon frame 1710, the RX communication unit transmits an association request frame 1720 to the TX communication unit.

As a response to the association request frame 1720, the TX communication unit transmits an ACK frame 1730 to the RX communication unit and sequentially transmits an association response frame 1740 to the RX communication unit.

After receiving the association response frame 1740, the RX communication unit transmits an ACK frame 1750 as a response to the association response frame 1740. Then, after completing MIMO beamforming 1760 setup, the RX communication unit enters the data transfer mode 420. The TX communication unit also completes the MIMO beamforming 1760 setup and then enters the data transfer mode 420. Herein, depending upon the situation, the MIMO beamforming setup may be skipped.

Figure 18:
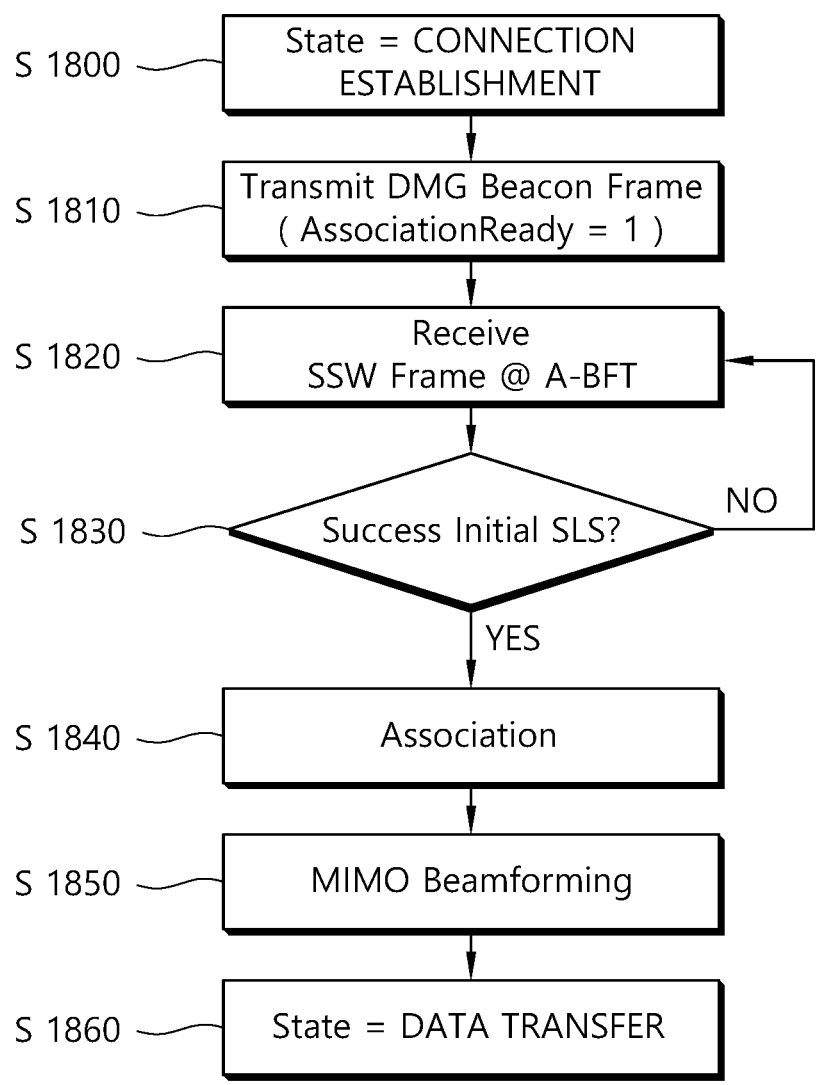
FIG. 18 is an operation flowchart of the wireless data transmitting device, when the connection re-establishment mode is initiated by the activation of the wireless data transmitting device.

FIG. 18 is an operation flowchart of the wireless data transmitting device, when the connection re-establishment mode is initiated by the activation of the wireless data transmitting device.

Referring to FIG. 18, while operating in the stand-by mode (S1800), the TX transmits a DMG beacon frame, to the RX, due to the activation of the TX (S1810). Thereafter, the TX enters the connection re-establishment mode. The TX sets the association ready information that is included in the DMG beacon frame to 1 (i.e., association ready (or ready for association)).

The TX receives an SSW frame from the RX during A-BFT (S1820) and determines whether or not initial SLS is correctly performed (S1830). If the initial SLS is not correctly performed, the TX performs once again step S1820. If the initial SLS is correctly performed, the TX receives an association request frame from the RX (S1840), performs MIMO beamforming setup (S1850), and then enters the data transfer mode (S1860). Herein, depending upon the situation, the MIMO beamforming setup may be skipped.

Figure 19:
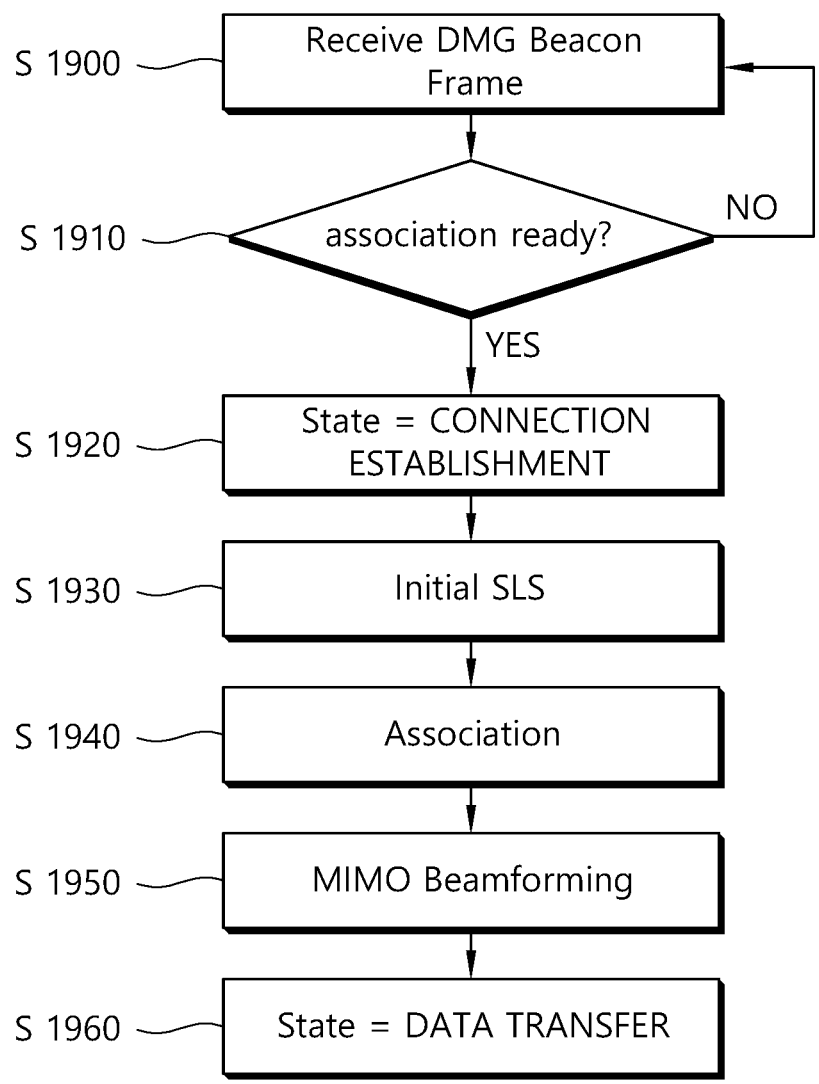
FIG. 19 is an operation flowchart of the wireless data receiving device, when the connection re-establishment mode is initiated by the activation of the wireless data transmitting device.

FIG. 19 is an operation flowchart of the wireless data receiving device, when the connection re-establishment mode is initiated by the activation of the wireless data transmitting device.

Referring to FIG. 19, while operating in the stand-by mode (S1900), the RX receives a DMG beacon frame, from the TX (S1910). If the association ready information in the DMG beacon frame indicates 0 (i.e., the TX is not in the association ready state), the RX performs once again step S1900. If the association ready information in the DMG beacon frame indicates 1 (i.e., the TX is in the association ready state), the RX determines that the TX is activated and then enters the connection re-establishment mode (S1920).

The RX performs initial SLS based on the DMG beacon frame (S1930), transmits an association request frame to the TX (S1940), performs MIM beamforming setup (S1950), and then enters the data transfer mode (S1960). Herein, depending upon the situation, the MIMO beamforming setup may be skipped.

Figure 20:
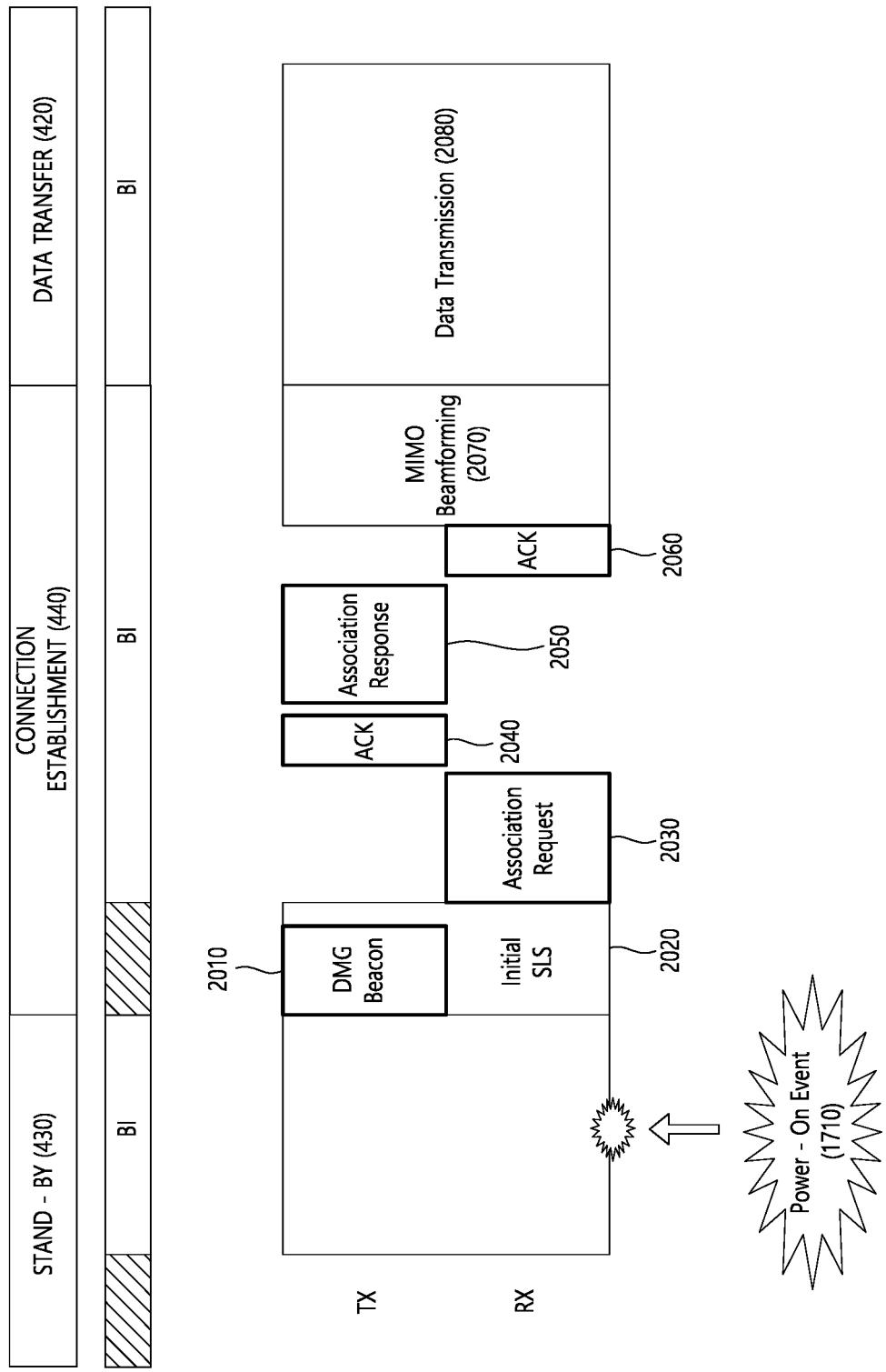
FIG. 20 is a conceptual diagram of a detailed communication procedure between a wireless data transmitting device and a wireless data receiving device, when a connection re-establishment mode is initiated by an activation of the wireless data receiving device.

FIG. 20 is a conceptual diagram of a detailed communication procedure between a wireless data transmitting device and a wireless data receiving device, when a connection re-establishment mode is initiated by an activation of the wireless data receiving device.

Referring to FIG. 20, if the RX is activated (i.e., power-on event 2000) while operating in the stand-by mode 430, a processor of the RX notifies the activation of the RX to the RX communication unit.

The RX communication unit receives a DMG beacon frame, from the TX, at a next beacon interval (S2010). At this point, since the TX communication unit may still be in the stand-by mode, the association ready information that is included in the DMG beacon frame may be association ready=0.

Since the TX communication unit fails to receive information on the activation of the RX (i.e., power-on event) from the RX communication, an initial SLS operation between the TX communication unit and the RX communication unit is first needed.

In the connection re-establishment mode 440, after performing initial SLS 2020, as a response to the received DMG beacon frame, the RX communication unit transmits an association request frame 2030 to the TX communication unit.

As a response to the association request frame 2030, the TX communication unit transmits an ACK frame 2040 to the RX communication unit and sequentially transmits an association response frame 2050 to the RX communication unit.

After receiving the association response frame 2050, the RX communication unit transmits an ACK frame 2060 as a response to the association response frame 2050. Then, after completing MIMO beamforming 2070 setup, the RX communication unit enters the data transfer mode 420. The TX communication unit also completes the MIMO beamforming 2070 setup and then enters the data transfer mode 420. Herein, depending upon the situation, the MIMO beamforming setup may be skipped.

Figure 21:
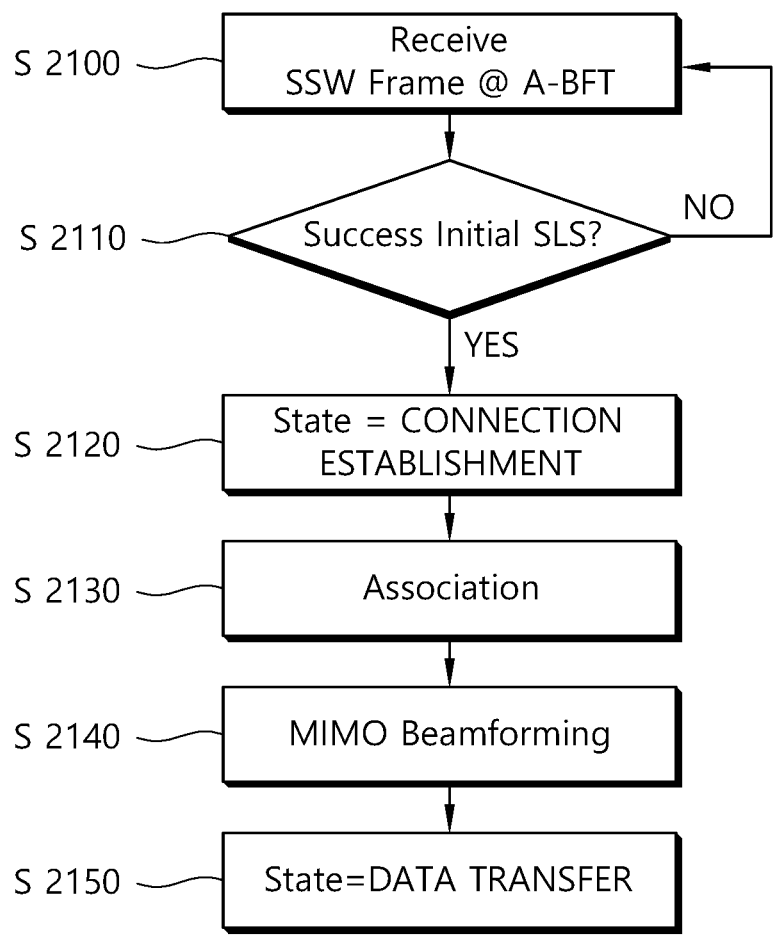
FIG. 21 is an operation flowchart of the wireless data transmitting device, when the connection re-establishment mode is initiated by the activation of the wireless data receiving device.

FIG. 21 is an operation flowchart of the wireless data transmitting device, when the connection re-establishment mode is initiated by the activation of the wireless data receiving device.

Referring to FIG. 21, while operating in the stand-by mode, the TX receives an SSW frame, from the RX, during A-BFT due to the activation of the RX (S2100). The TX determines whether or not the initial SLS is successfully completed (S2110), and, if it is determined that the initial SLS has failed, the TX waits for another initial SLS attempt by the RX. If it is determined that the initial SLS is successful, the TX recognizes the situation where the RX is activated (i.e., a situation where a power-on event occurs in the RX) and then enters the connection re-establishment mode (S2120).

The TX receives an association request frame from the RX (S2130), and, after performing MIMO beamforming setup (S2140), the TX enters the data transfer mode (S2150). Herein, during the association process after the initial SLS, based on the feedback data (i.e., association request frame 2020) that is received from the RX communication unit, the TX communication unit may determine whether to enter the data transfer mode through connection setup or whether to enter the stand-by mode. Additionally, depending upon the situation, the MIMO beamforming setup may be skipped.

Figure 22:
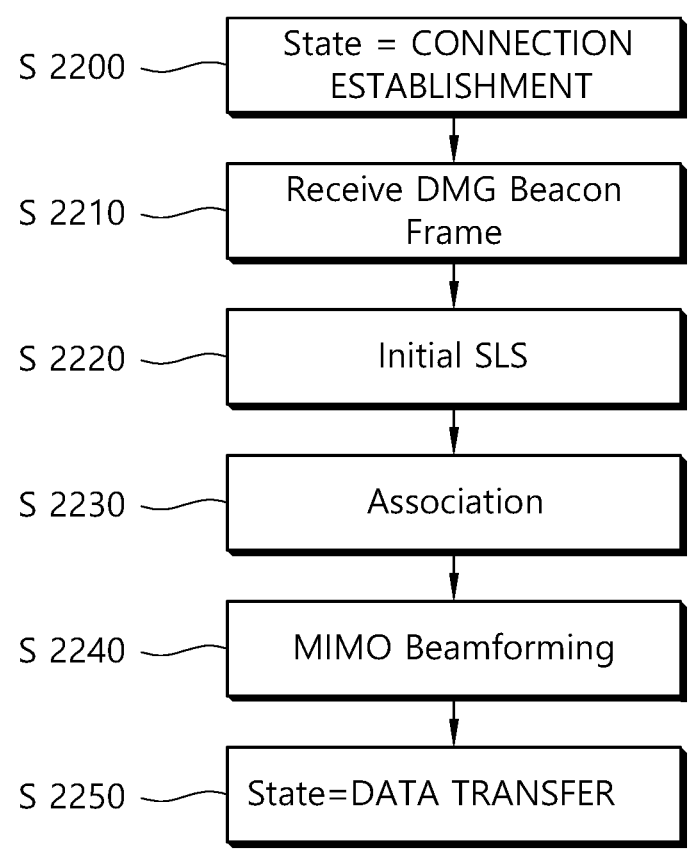
FIG. 22 is an operation flowchart of the wireless data receiving device, when the connection re-establishment mode is initiated by the activation of the wireless data receiving device.

FIG. 22 is an operation flowchart of the wireless data receiving device, when the connection re-establishment mode is initiated by the activation of the wireless data receiving device.

Referring to FIG. 22, while operating in the stand-by mode, the RX enters the connection re-establishment mode due to the activation of the RX (S2200). The RX communication unit receives a DMG beacon frame, from the TX, at a next beacon interval (S2210). At this point, since the TX communication unit may still be in the stand-by mode, the association ready information that is included in the DMG beacon frame may be association ready=0.

In the connection re-establishment mode, the RX performs initial SLS (S2220). The RX may implicitly notify (or inform) the TX of its activation (or activated state) through the initial SLS. Thereafter, the RX transmits an association request frame to the TX (S2230), and, after performing MIMO beamforming setup (S2240), the RX enters the data transfer mode (S2250).

Connection Re-Establishment Mode

Figure 23:
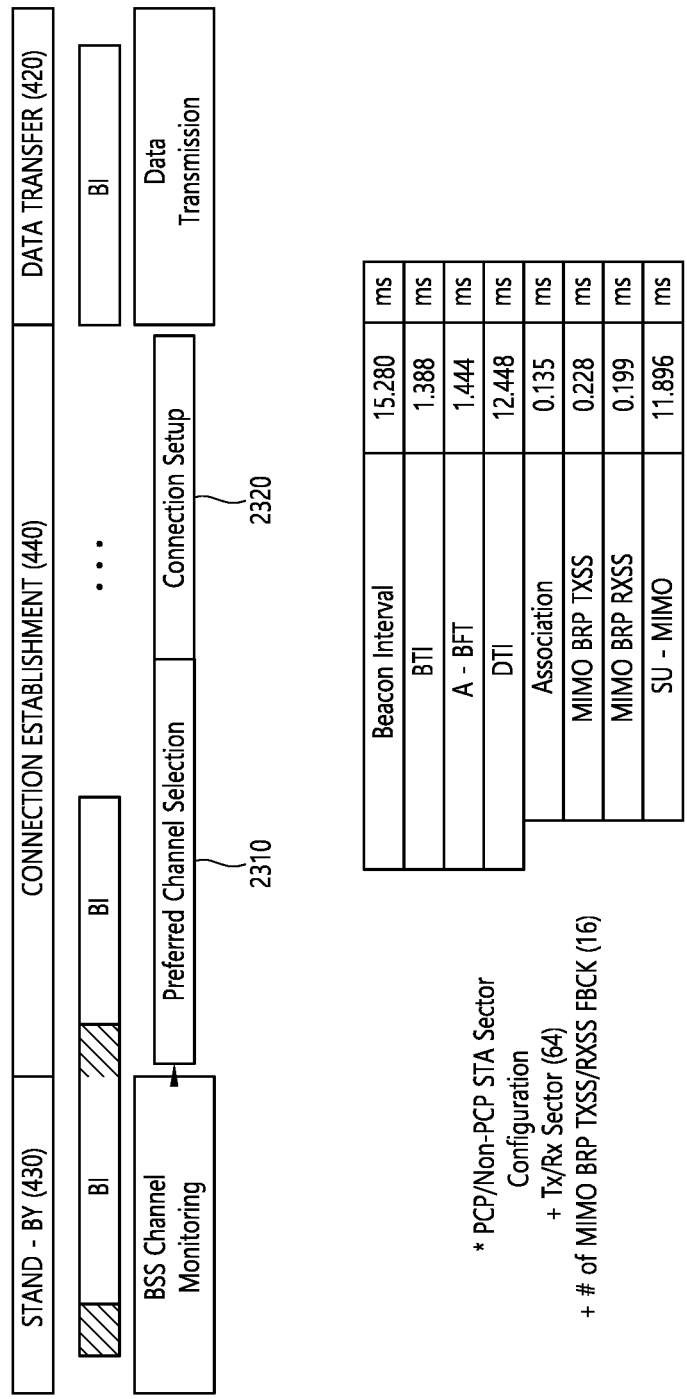
FIG. 23 is a conceptual diagram of a detailed communication procedure between a wireless data transmitting device and a wireless data receiving device in a connection re-establishment mode according to an embodiment.

FIG. 23 is a conceptual diagram of a detailed communication procedure between a wireless data transmitting device and a wireless data receiving device in a connection re-establishment mode according to an embodiment.

Referring to FIG. 23, in the stand-by mode 430, each of a communication unit of the TX and a communication unit of the RX performs BSS channel monitoring. Thereafter, due to the activation of the TX communication unit and/or RX communication unit, the wireless AV system enters the connection re-establishment mode 440.

In the connection re-establishment mode 440, the TX communication unit and the RX communication unit may perform preferred DMG channel selection 2310 and connection setup 2320 including scanning and initialization.

More specifically, in the connection re-establishment mode 440, the RX communication unit transmits (reports), to the TX communication unit, DMG channel measurement results that were collected during the stand-by mode 430. The DMG channel measurement result(s) may, for example, be transmitted through the association request frame, which is transmitted by the RX communication unit.

The TX communication unit may select a preferred DMG channel, based on the results of BSS channel monitoring that is performed by the TX communication itself, and based on the DMG channel measurement results that are reported by the RX communication unit. For example, if the DMG channel that is selected during the connection re-establishment mode 440 is different from the DMG channel of the stand-by mode 430, the TX communication unit indicates a BSS parameter change to the RX communication unit and changes the preferred DMG channel. The method for performing DMG channel selection 2310, by the TX communication unit and the RX communication unit, in the connection re-establishment mode 440, will be described in more detail in FIG. 24 and FIG. 25.

Meanwhile, the TX communication unit and the RX communication unit perform connection setup 2320, which include scanning and initialization, over the selected preferred channel. Herein, the connection setup 2320 may include a step of receiving, by the TX communication unit, information related to the DMG channel measurement from the RX communication unit, a step of performing association with the RX communication unit in the preferred DMG channel based on the information related to the DMG channel measurement, and a step of performing MIMO beamforming setup. Herein, depending upon the situation, the MIMO beamforming setup may be skipped.

Figure 24:
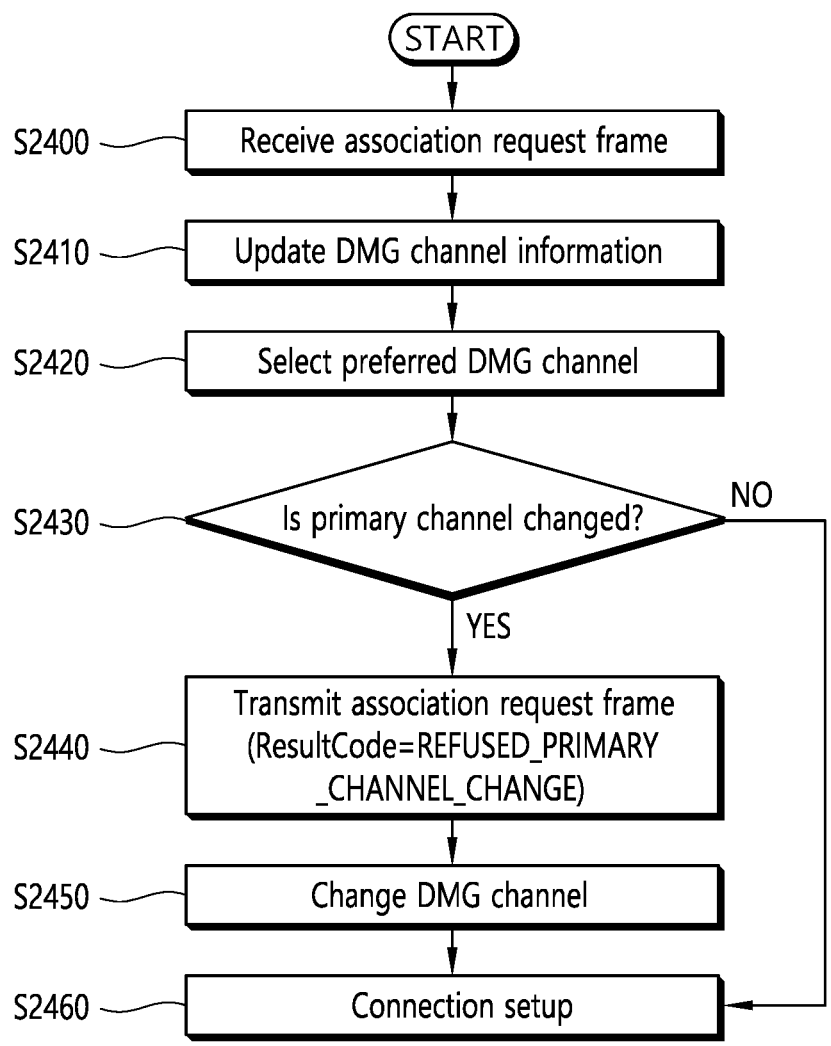
FIG. 24 is an operation flowchart of a preferred DMG channel selection that is performed by a wireless data transmitting device in a connection re-establishment mode according to an embodiment.

FIG. 24 is an operation flowchart of a preferred DMG channel selection that is performed by a wireless data transmitting device in a connection re-establishment mode according to an embodiment.

Referring to FIG. 24, after entering the connection re-establishment mode, when the TX communication unit receives an association request frame including the DMG channel measurement result(s) from the RX communication unit (S2400), the TX communication unit updates DMG channel information based on the DMG channel measurement result(s) (S2410). The TX communication unit selects a preferred DMG channel in accordance with a preconfigured standard (S2420). The TX communication unit determines whether or not the primary channel of the TX communication is changed (S2430). If the selected DMG primary channel is the same as the previous DMG primary channel (i.e., if the primary channel is not changed), the TX communication unit performs the connection setup 2320.

Conversely, if the selected DMG primary channel and the previous DMG primary channel are different (i.e., if the primary channel is changed), the TX communication unit transmits an association response frame to the RX communication unit (S2440). At this point, a ResultCode that is included in the association response frame indicates a refusal that is caused by the primary channel change (REFUSED_PRIMARY_CHANNEL_CHANGE). At this point, the BSS parameter change is also indicated to the RX communication unit.

(For EDMG Operation element @ Association Response frame, if ResultCode=SUCCESS, then the same as before or new secondary channel or if ResultCode=REFUSED_TEMPORARILY, then new Primary Channel & BSS Operating Channels)

Thereafter, the TX communication unit changes the DMG channel (S2450), and, by transmitting a DMG beacon frame according to the BSS parameter over the changed DMG channel to the RX communication unit, the TX communication unit performs connection setup (S2460).

Figure 25:
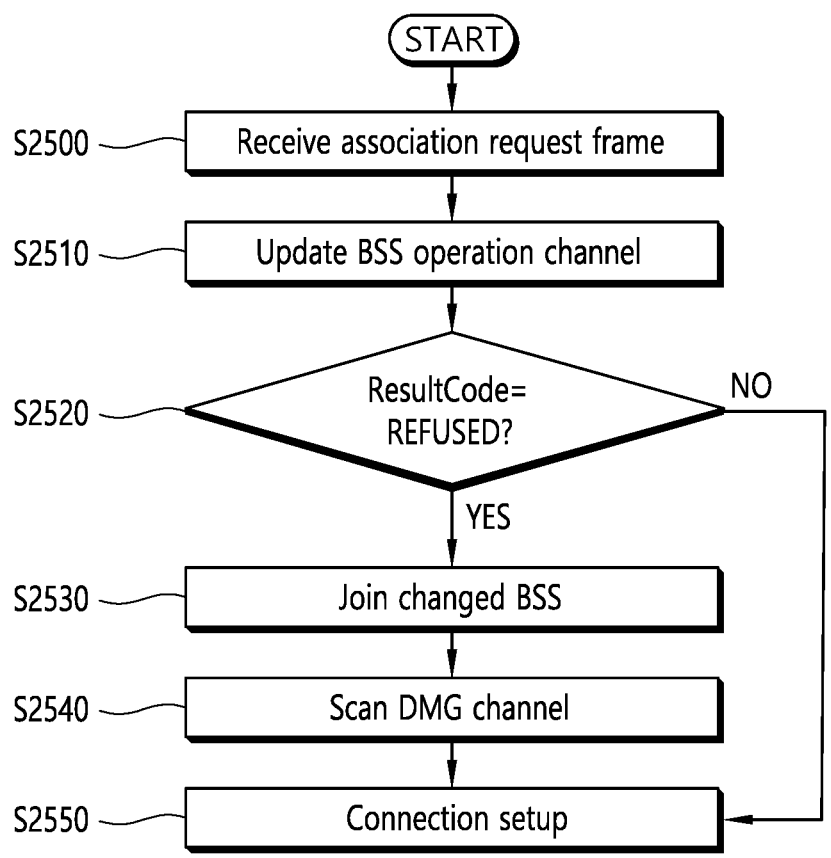
FIG. 25 is an operation flowchart of a preferred DMG channel selection that is performed by a wireless data receiving device in a connection re-establishment mode according to an embodiment.

FIG. 25 is an operation flowchart of a preferred DMG channel selection that is performed by a wireless data receiving device in a connection re-establishment mode according to an embodiment.

Referring to FIG. 25, after entering the connection re-establishment mode, when the RX communication unit receives an association response frame including a ResultCode from the TX communication unit (S2500), the RX communication unit performs an update of a BSS operation channel (S2510). The RX communication unit determines whether or not the ResultCode indicates a refusal that is caused by the primary channel change (REFUSED_PRIMARY_CHANNEL_CHANGE) (S2520). If the ResultCode does not indicate REFUSED_PRIMARY_CHANNEL_CHANGE, the RX communication unit determines that the association is successful and then performs connection setup (S2550). Conversely, if the ResultCode indicates REFUSED_PRIMARY_CHANNEL_CHANGE, the RX communication unit determines that the TX communication unit has changed the DMG channel and joins the changed BSS (S2530).

The RX communication unit performs DMG channel scan for the changed BSS (S2540) and then performs connection setup (S2550).

Chance from the Data Transfer Mode to the Connection Re-Establishment Mode

The wireless AV system may enter the connection re-establishment mode from the data transfer mode. Such entry may be carried out when a wireless channel quality of the wireless AV system becomes poor in the data transfer mode.

Figure 26:
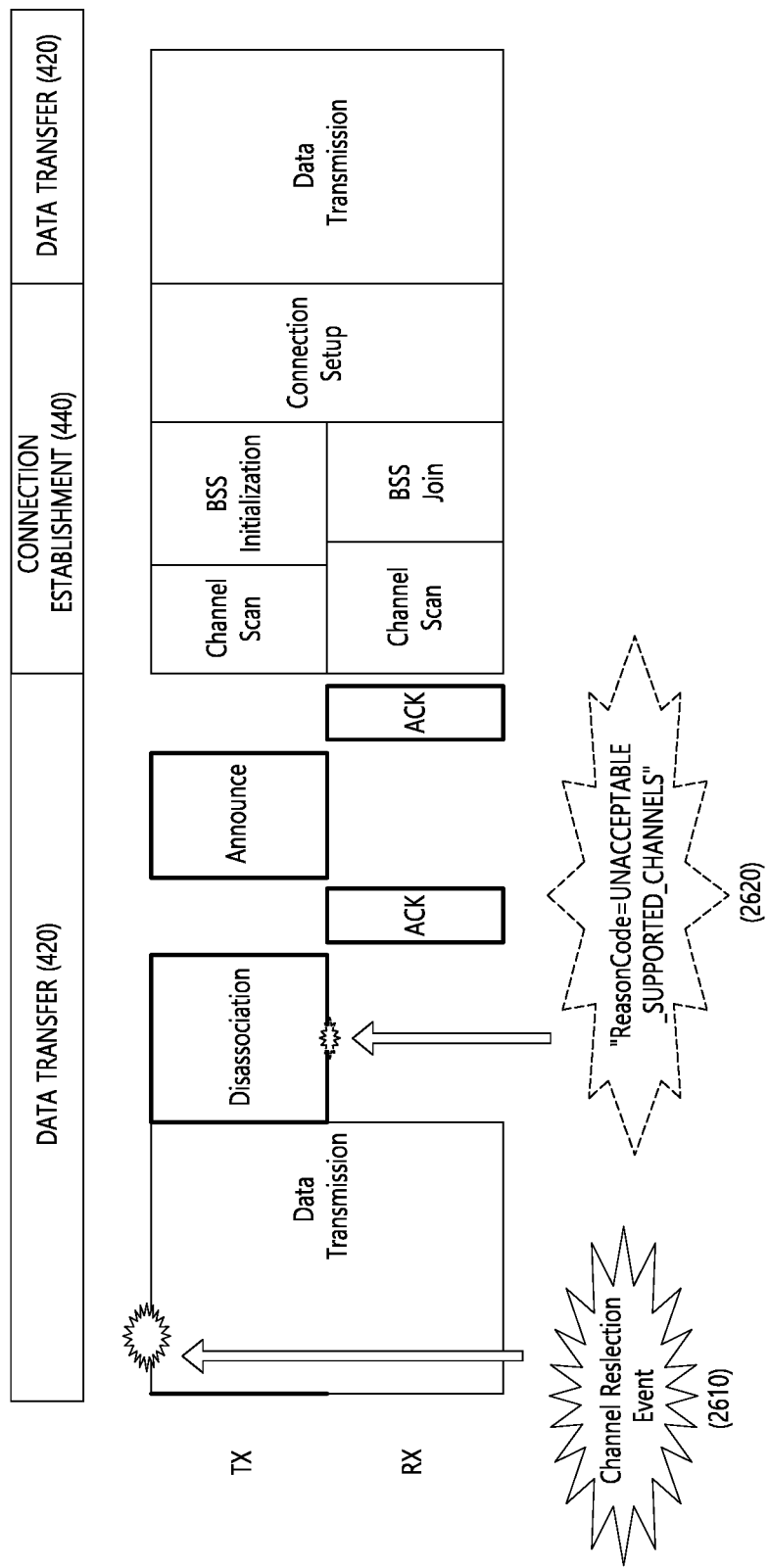
FIG. 26 is a conceptual diagram of a procedure for entering a connection re-establishment mode from a data transfer mode, by a wireless AV system, according to an embodiment.

FIG. 26 is a conceptual diagram of a procedure for entering a connection re-establishment mode from a data transfer mode, by a wireless AV system, according to an embodiment.

Referring to FIG. 26, while the wireless AV system (TX communication unit and RX communication unit) operates in the data transfer mode 420, when the TX communication unit determines that the channel quality has become poor to a point where it is difficult for the TX communication unit to transfer data to the RX communication unit (Decision criterion: Channel quality or BER), the TX processor or communication unit triggers a channel reselection event. The channel reselection event may be triggered by an RX processor or RX communication unit. When the channel reselection event is triggered, the TX communication unit sequentially transmits a disassociation frame and an announce frame to the RX communication unit and then enters the connection re-establishment mode. Herein, a ReasonCode of the disassociation frame may indicate unacceptable supported channels (UNACCEPTABLE_SUPPORTED_CHANNELS).

When the TX communication unit enters the connection re-establishment mode 440, the TX communication unit performs channel scan, BSS initialization, and connection setup, and the RX communication unit channel scan, BSS join, and connection setup.

The channel scan includes a step of selecting, by the TX communication unit, a DMG channel having a better channel quality than the existing channel, and a step of transmitting, by the TX communication unit, a DMG beacon frame including information on the BSS, to the RX communication unit, over the selected DMG channel at a beacon interval (BI) period. When channel bonding is supported, the selected DMG channel may correspond to a bonding of a primary channel and a secondary channel.

Additionally, the DMG beacon frame may include association ready information indicating whether or not the TX communication unit is ready for association.

The connection setup may include a step of transmitting, by the TX communication unit, a DMG beacon frame at a beacon transmission interval (BTI) from which the beacon interval starts, thereafter, a step of transmitting an association-beamforming training (A-BFT), a step of performing association with the RX at a data transmission interval (DTI), after a beacon header interval (BHI), which is configured of the BTI and A-BFT, and a step of performing MIMO beamforming setup. Herein, when performing connection setup, the association may be achieved with no authentication between the TX and the RX. Herein, depending upon the situation, the MIMO beamforming setup may be skipped.

The TX communication unit may transmit a DMG beacon frame through both the primary channel and the secondary channel that are allocated to the TX based on channel bonding. This prevents another PCP or station from receiving the DMG beacon frame and performing BSS initialization and data transmission in the corresponding DMG channel.

The channel scan & join includes a step of searching and receiving, by the RX communication unit, a DMG beacon frame including information on the BSS that is transmitted from the TX communication unit at a beacon interval, and a step of joining the BSS, when the DMG beacon frame search and reception is successful. Herein, the channel scan & join may further include a step of performing, by the RX communication unit, monitoring of a DMG channel and DMG channel measurement.

The connection setup includes a step of performing, by the RX communication unit, sector level sweep (SLS) based on the DMG beacon frame and sector sweep feedback (SSW-FBCK), a step of performing association with the TX communication unit, and a step of performing MIMO beamforming setup. Herein, depending upon the situation, the MIMO beamforming setup may be skipped.

In the connection re-establishment mode 440, if all processes up to the connection setup are completed, the TX communication unit and the RX communication unit enter the data transfer mode 420 once again.

Exceptional Handling

Figure 27:
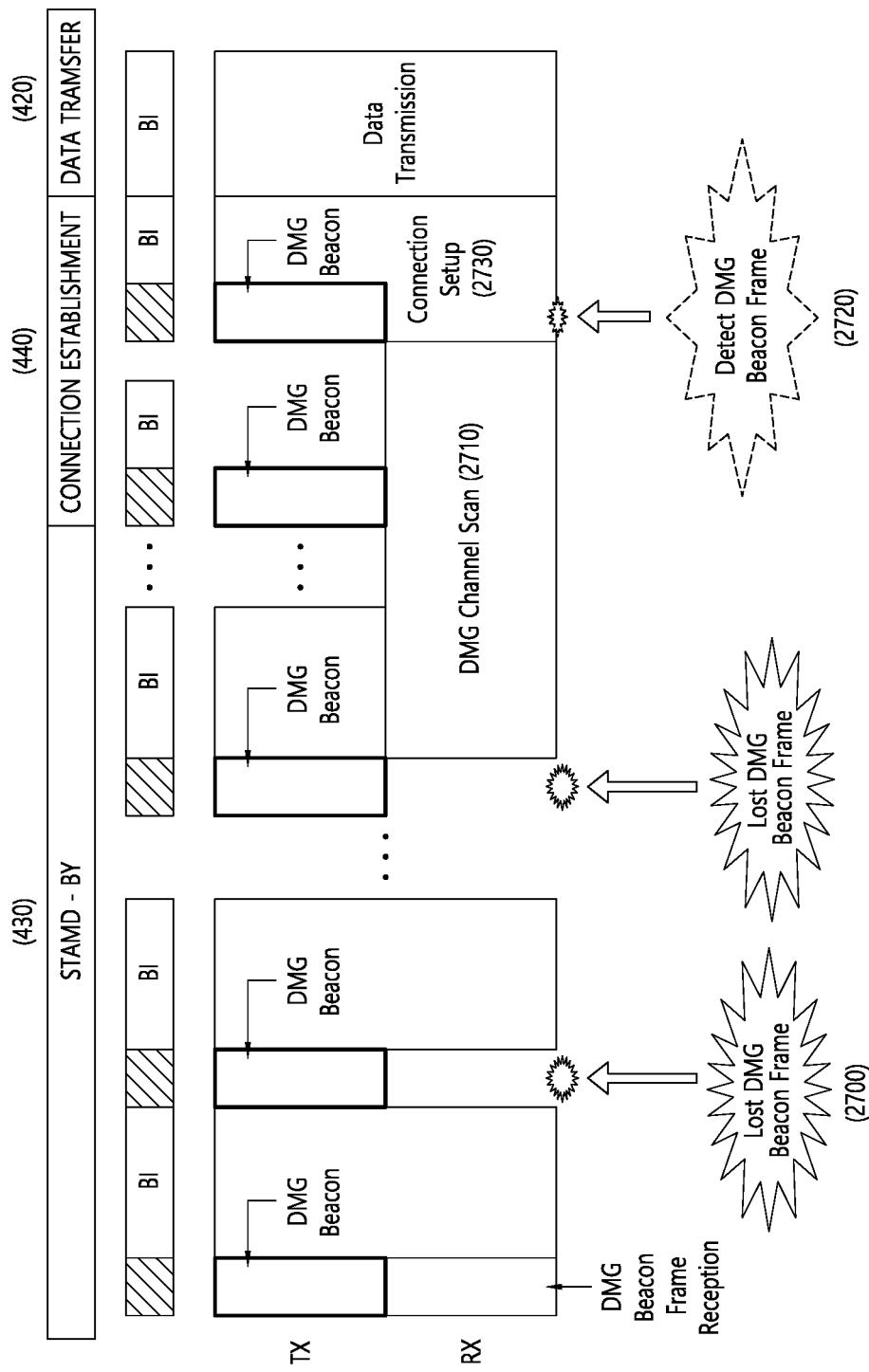
FIG. 27 is a conceptual diagram of a procedure for performing exceptional handling, by a wireless AV system, when an exceptional situation occurs according to an embodiment.

FIG. 27 is a conceptual diagram of a procedure for performing exceptional handling, by a wireless AV system, when an exceptional situation occurs according to an embodiment.

Referring to FIG. 27, in the stand-by mode 430, when the communication state between the TX communication unit and the RX communication unit becomes deteriorated, a loss 2700 in the DMG beacon frame may occur. In case of the TX, when poor channel quality occurs, the channel quality may be recovered by performing preferred channel switching and better ranked channel selection. Conversely, in case of the RX, the RX may have a problem of failing to correctly receive the DMG beacon frame. As described above, in the RX communication unit fails to correctly receive the DMG beacon frame, the wireless AV system enters the connection re-establishment mode 440 and then performs DMG channel scan 2710 once again in order to receive a DMG beacon frame from the TX communication unit.

For example, the RX communication unit may scan a DMG channel or receive a DMG beacon frame based on a cycle period and/or beacon frame receive window that is/are predefined in the connection re-establishment mode 440. As an example, the TX communication unit transmits a DMG beacon frame, to the RX communication unit, based on a cycle period and/or window that is/are predefined after activation (i.e., Power-On). When the RX communication unit successfully detects a DMG beacon frame 2720, the RX communication unit requests connection setup 2730 to the TX communication unit. When the TX communication unit receives the connection setup 2730 request from the RX communication unit, the TX communication unit performs directional beam setup and association through the connection setup 2730.

Reducing Power Consumption

In the wireless AV system, when minimizing DMG beacon frame transmission, the power consumption of the TX and the RX may be reduced.

Figure 28:
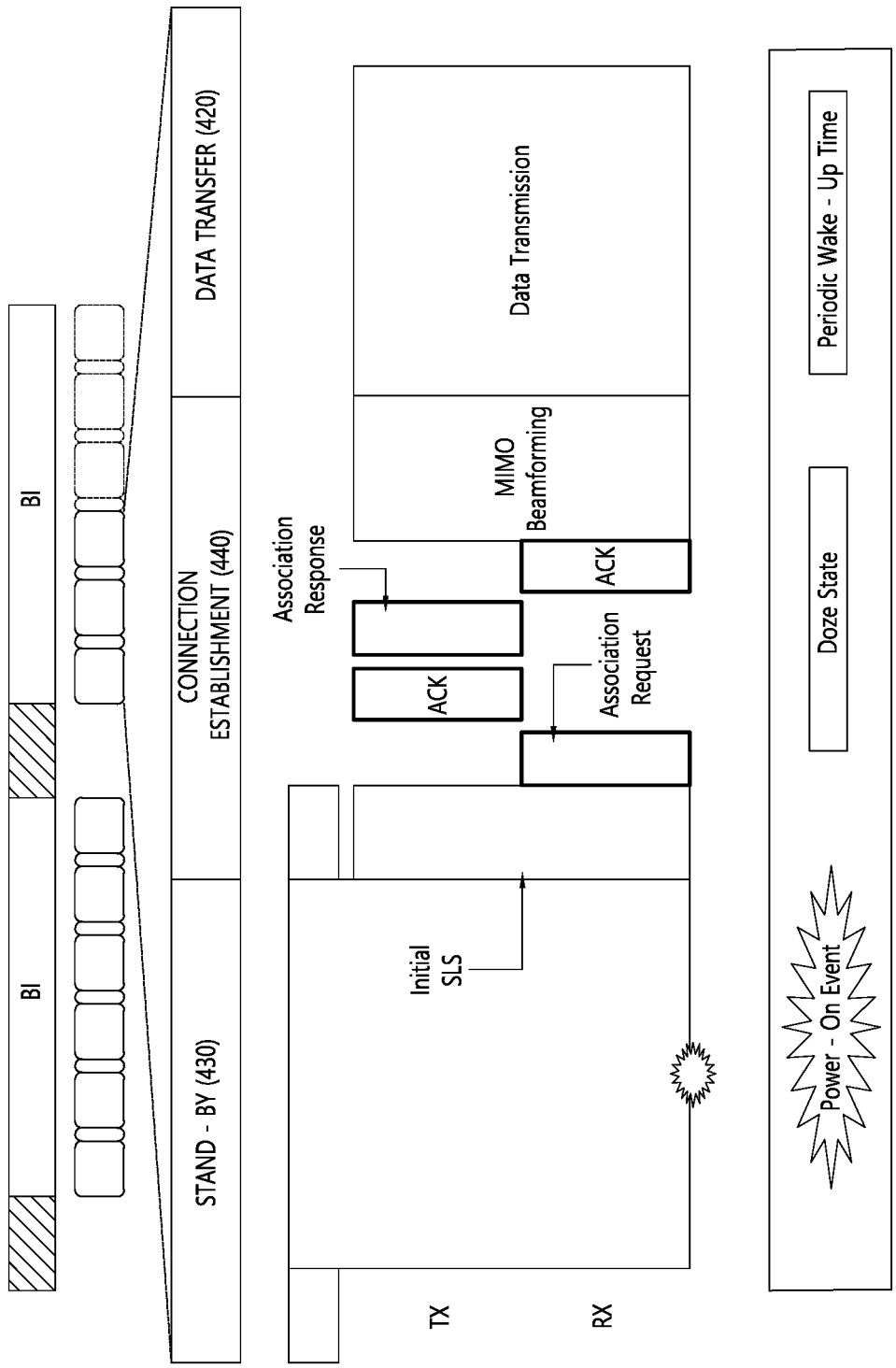
FIG. 28 shows a super-frame structure for reducing power consumption of a wireless AV system according to an embodiment.

FIG. 28 shows a super-frame structure for reducing power consumption of a wireless AV system according to an embodiment.

Referring to FIG. 28, a communication unit of the TX may be provided so as to support a TXSS function that transmits an SSW frame instead of a DMG beacon frame. This may further reduce the delay time during the process of turning on the power as compared to the beacon interval.

Since the device and method for receiving wireless data or the device and method for transmitting wireless data according to the above-described embodiments of the present disclosure do not mandatorily require all of the components or operations that are described above, the device and method for receiving wireless data or the device and method for transmitting wireless data may be performed by including all or part of the above-described components or operations. Additionally, the above-described embodiments of the device and method for receiving wireless data or the device and method for transmitting wireless data may be performed in combination with each other. Furthermore, the above-described components or operations are not mandatorily required to be performed in the order that is described above, and, therefore, it is also possible for components or operations (or process steps) that are described in a later order to be performed before the components or operations (or process steps) that are described in an earlier order.

The foregoing description has been presented merely to provide an exemplary description of the technical idea of the present disclosure, and it will be apparent to those skilled in the art to which the present disclosure pertains, that various changes and modifications in the embodiments described herein can be made without departing from the scope and spirit of the present disclosure. Therefore, the embodiments of the present disclosure described above can be implemented separately or in combination with each other.

The embodiments disclosed herein are provided not to limit the technical idea of the present disclosure but to describe the present disclosure, and the scope of the technical idea of the present disclosure should not be limited to these embodiments. The scope of the present disclosure should be interpreted by the following claims, and all technical ideas within the scope of equivalents thereto should be construed as being included in the scope of the present disclosure.

What is claimed is:

1. A wireless data receiving device, comprising:
a transceiver being configured to receive data related to a video through a wireless channel from a wireless data transmitting device;
a display unit outputting the video;
a processor being configured to perform an initial connection establishment mode performing connection setup related to the wireless data transmitting device, when the transceiver is turned on, a data transfer mode receiving the data related to the video through the transceiver, a stand-by mode during which the wireless data receiving device or wireless data transmitting device is deactivated, and a connection re-establishment mode performing connection setup related to the wireless data transmitting device, when the wireless data receiving device and wireless data transmitting device are activated; and
a memory being configured to store operation algorithm and control information of an operation that is performed in at least one of the initial connection establishment mode, the data transfer mode, the stand-by mode, and the connection re-establishment mode, and to be connected to the processor so as to store the data related to the video according to instructions made by the processor,
wherein the initial connection establishment mode includes scanning and initialization, and the connection setup,
wherein the scanning and initialization includes a step of searching, by the transceiver, a directional multi-gigabit (DMG) beacon frame including information on a base service set (BSS) that is transmitted from the wireless data transmitting device at a beacon interval (BI) cycle period with a beacon interval (BI) that does not include a beacon header interval (BHI), and a step of joining the BSS, when the DMG beacon frame search is successful, and
wherein the connection setup includes a step of performing, by the transceiver, sector level sweep (SLS) based on the DMG beacon frame, a step of performing association with no authentication with the wireless data transmitting device, and a step of performing MIMO beamforming setup.

2. The wireless data receiving device of claim 1, wherein the DMG beacon frame is received through both a primary channel and a secondary channel that are allocated to the wireless data transmitting device based on channel bonding.

3. The wireless data receiving device of claim 1, wherein, in the data transfer mode, the transceiver alternately receives a data frame and a margin frame corresponding to the data frame, and
wherein a time duration during which the data frame and the margin frame are transmitted is determined based on a length of a MAC input buffer.

4. The wireless data receiving device of claim 3, wherein, in the data transfer mode, the transceiver receives time stamp information each time a data frame is received and synchronizes timing of the data frame based on the time stamp information, and
wherein the margin frame is used for at least one of data re-transmission, beamformed link maintenance, and null frame transmission.

5. The wireless data receiving device of claim 1, wherein activation and deactivation of the wireless data receiving device each includes a turn on operation and a turn off operation of the display unit, and
wherein activation and deactivation of the wireless data transmitting device each includes a turn on operation and a turn off operation of a transmission function transmitting the data related to the video.

6. The wireless data receiving device of claim 1, wherein, in the stand-by mode, the transceiver monitors the DMG beacon frame during a first time duration in which transmission of a DMG beacon frame, by the wireless data transmitting device, is scheduled, and
wherein the transceiver performs DMG channel measurement during a second time duration in which transmission of the DMG beacon frame is not scheduled.

7. The wireless data receiving device of claim 1, wherein, when the stand-by mode is initiated by a deactivation of the wireless data transmitting device, the transceiver enters the stand-by mode by sequentially receiving, from the wireless data transmitting device, a disassociation frame instructing disassociation of the transceiver from the wireless data transmitting device and an announce frame for time synchronization function (TSF) timer synchronization, and
wherein the announce frame includes information on a location where the DMG beacon frame is transmitted.

8. The wireless data receiving device of claim 7, wherein, in the stand-by mode, the transceiver monitors the DMG beacon frame during a first time duration in which transmission of a DMG beacon frame, by the wireless data transmitting device, is scheduled, and performs DMG channel measurement during a second time duration in which transmission of the DMG beacon frame is not scheduled, and
wherein the DMG beacon frame includes PCP association ready information indicating whether or not the wireless data transmitting device is ready for association.

9. The wireless data receiving device of claim 8, wherein, in the stand-by mode, if it is verified that the wireless data transmitting device is ready for association based on the PCP association ready information, the transceiver enters the connection re-establishment mode including scanning and initialization, and the connection setup,
wherein the scanning and initialization includes a step of searching, by the transceiver, a DMG beacon frame including information on a BSS that is transmitted from the wireless data transmitting device at a beacon interval (BI) cycle period, and a step of joining the BSS, when the DMG beacon frame search is successful, and wherein the connection setup includes a step of performing, by the transceiver, SLS based on the DMG beacon frame, a step of transmitting information on the DMG channel measurement to the wireless data transmitting device, a step of performing association with the wireless data transmitting device in a preferred DMG channel that is selected based on the information on the DMG channel measurement, and a step of performing MIMO beamforming setup.

10. The wireless data receiving device of claim 1, wherein, when the stand-by mode is initiated by a deactivation of the wireless data receiving device, the transceiver enters the stand-by mode by transmitting, to the wireless data transmitting device, a disassociation frame instructing disassociation of the transceiver from the wireless data transmitting device, and by receiving, from the wireless data transmitting device, an announce frame for TSF timer synchronization, and wherein the announce frame includes information on a location where the DMG beacon frame is transmitted.

11. The wireless data receiving device of claim 10, wherein, in the stand-by mode, the transceiver monitors the DMG beacon frame during a first time duration in which transmission of a DMG beacon frame, by the wireless data transmitting device, is scheduled, and performs DMG channel measurement during a second time duration in which transmission of the DMG beacon frame is not scheduled.

12. The wireless data receiving device of claim 11, wherein, when the connection re-establishment mode is initiated by an activation of the wireless data receiving device, the transceiver enters the connection re-establishment mode including scanning and initialization, and the connection setup, wherein the scanning and initialization includes a step of searching, by the transceiver, a DMG beacon frame including information on a BSS that is transmitted from the wireless data transmitting device at a beacon interval (BI) cycle period, and a step of joining the BSS, when the DMG beacon frame search is successful, and wherein the connection setup includes a step of performing, by the transceiver, SLS based on the DMG beacon frame, a step of transmitting information on the DMG channel measurement to the wireless data transmitting device, a step of performing association with the wireless data transmitting device in a preferred DMG channel that is selected based on the information on the DMG channel measurement, and a step of performing MIMO beamforming setup.

13. A wireless data transmitting device, comprising:
a transceiver being configured to transmit data related to a video through a wireless channel to a wireless data receiving device;
a processor being configured to perform an initial connection establishment mode performing connection setup related to the wireless data receiving device, when the transceiver is turned on, a data transfer mode transmitting the data related to the video through the transceiver, a stand-by mode during which the wireless data transmitting device or wireless data receiving device is deactivated, and a connection re-establishment mode performing connection setup related to the wireless data receiving device, when the wireless data transmitting device and wireless data receiving device are activated; and
a memory being configured to store operation algorithm and control information of an operation that is performed in at least one of the initial connection establishment mode, the data transfer mode, the stand-by mode, and the connection re-establishment mode, wherein the initial connection establishment mode includes scanning and initialization, and the connection setup, wherein the scanning and initialization includes a step of searching, by the transceiver, a directional multi-gigabit (DMG) beacon frame including information on a base service set (BSS) that is transmitted from the wireless data transmitting device at a beacon interval (BI) cycle period with a beacon interval (BI) that does not include a beacon header interval (BHI), and a step of joining the BSS, when the DMG beacon frame search is successful, and wherein the connection setup includes a step of performing, by the transceiver, sector level sweep (SLS) based on the DMG beacon frame, a step of performing association with no authentication with the wireless data transmitting device, and a step of performing MIMO beamforming setup.

14. The wireless data transmitting device of claim 13, wherein the DMG beacon frame is transmitted through both a primary channel and a secondary channel that are allocated to the wireless data transmitting device based on channel bonding.

15. The wireless data transmitting device of claim 13, wherein, in the data transfer mode, the transceiver alternately transmits a data frame and a margin frame corresponding to the data frame, and wherein a time duration during which the data frame and the margin frame are transmitted is determined based on a length of a MAC input buffer.

16. The wireless data transmitting device of claim 15, wherein, in the data transfer mode, the transceiver transmits time stamp information each time a data frame is transmitted and synchronizes timing of the data frame based on the time stamp information, and wherein the margin frame is used for at least one of data re-transmission, beamformed link maintenance, and null frame transmission.

17. The wireless data transmitting device of claim 13, wherein activation and deactivation of the wireless data receiving device each includes a turn on operation and a turn off operation of the display unit, and wherein activation and deactivation of the wireless data transmitting device each includes a turn on operation and a turn off operation of a transmission function transmitting the data related to the video.

18. The wireless data transmitting device of claim 13, wherein, in the stand-by mode, the transceiver performs DMG channel measurement during a time duration in which transmission of the DMG beacon frame is not scheduled.

* * * * *